US012457647B2

(12) United States Patent
George et al.

(10) Patent No.: US 12,457,647 B2
(45) Date of Patent: Oct. 28, 2025

(54) CALL COLLISION RESOLUTION

(71) Applicant: Apple Inc., Cupertino, CA (US)

(72) Inventors: Anish George, Bangalore (IN); Anand N. Nirwani, Cupertino, CA (US); Pratyush Gudla, Bengaluru (IN)

(73) Assignee: Apple Inc., Cupertino, CA (US)

( * ) Notice: Subject to any disclaimer, the term of this patent is extended or adjusted under 35 U.S.C. 154(b) by 588 days.

(21) Appl. No.: 17/840,485

(22) Filed: Jun. 14, 2022

(65) Prior Publication Data

US 2023/0007704 A1   Jan. 5, 2023

(51) Int. Cl.
*H04L 5/20* (2006.01)
*H04M 3/42* (2006.01)
*H04M 7/00* (2006.01)
*H04W 74/0833* (2024.01)
*H04W 76/18* (2018.01)

(52) U.S. Cl.
CPC ......... *H04W 74/0858* (2013.01); *H04M 3/42* (2013.01); *H04M 7/0081* (2013.01); *H04W 76/18* (2018.02); *H04M 2207/18* (2013.01)

(58) Field of Classification Search
CPC ... H04W 74/0858; H04W 76/18; H04M 3/42; H04M 7/0081; H04M 2207/18; H04M 3/42051; H04M 3/02; H04M 3/42093; H04M 7/08; H04M 11/062; H04M 3/56; H04M 3/561; H04M 7/006; H04M 3/567; H04L 65/1069; H04L 5/20; H04L 29/06027; H04B 3/00; H04B 1/58
See application file for complete search history.

(56) References Cited

U.S. PATENT DOCUMENTS

| | | | |
|---|---|---|---|
| 7,395,057 B2 * | 7/2008 | Awasthi | H04W 76/19 455/423 |
| 7,991,144 B2 | 8/2011 | Takahashi | |
| 8,755,502 B1 * | 6/2014 | Schlesener | H04M 3/42 455/445 |
| 11,233,899 B2 * | 1/2022 | Michaelis | H04M 3/42153 |
| 2008/0226053 A1 * | 9/2008 | Takahashi | H04M 3/42187 379/208.01 |
| 2010/0284288 A1 * | 11/2010 | Lee | H04L 63/1416 370/252 |
| 2012/0057683 A1 * | 3/2012 | Liik | H04L 65/1069 379/32.01 |
| 2016/0036991 A1 * | 2/2016 | Brewer | H04L 65/1076 370/356 |
| 2017/0127254 A1 * | 5/2017 | Fish | H04W 4/16 |

(Continued)

FOREIGN PATENT DOCUMENTS

EP   3255860 A1   12/2017
KR   20140075571 A   6/2014

OTHER PUBLICATIONS

Rosenberg et al, SIP: Session Initiation Protocol, Jun. 2002, Network Working Group, Request for Comment 3261, Standard Track, pp. 1-269 (Year: 2002).*

(Continued)

*Primary Examiner* — Phuongchau Ba Nguyen
(74) *Attorney, Agent, or Firm* — Kilpatrick Townsend & Stockton LLP

(57) ABSTRACT

The present application relates to devices and components including apparatus, systems, and methods to provide call collision resolution procedures in wireless communication systems.

14 Claims, 11 Drawing Sheets

(56) References Cited

U.S. PATENT DOCUMENTS

2017/0353503 A1\* 12/2017 Trabelsi .............. H04L 65/1104
2021/0195021 A1 6/2021 Michaelis et al.

OTHER PUBLICATIONS

IN202141029374, "First Examination Report", Feb. 7, 2023, 6 pages.
European Patent Application No. 22178663.5, Extended European Search Report, Oct. 20, 2022, 10 pages.
Rosenberg, et al., SIP: Session Initiation Protocol, Network Working Group, Available Online at: https://www.rfc-editor.org/rfc/rfc3261.txt, Jun. 2002, 269 pages.
European Patent Application No. 22178663.5, Office Action, Dec. 13, 2024, 7 pages.
The Chinese Application No. CN202210676409.X, "Office Action", mailed Apr. 25, 2024, 11 pages.

\* cited by examiner

CALL COLLISION RESOLUTION

CROSS-REFERENCES TO RELATED APPLICATIONS

This application claims the benefit of Indian Patent Application No. 202141029374, filed on Jun. 30, 2021, the contents of which are incorporated herein by reference in its entirety for all purposes.

BACKGROUND

For generation telephone calls have been a common form of communication between individuals. As technology has developed and the human population has grown, user equipments (UEs) for completing telephone calls have become common place and the number of UEs to be served has drastically increased. These changes in technology and increase in the number of UEs to be served has brought about many challenges.

DETAILED DESCRIPTION

Figure 1:
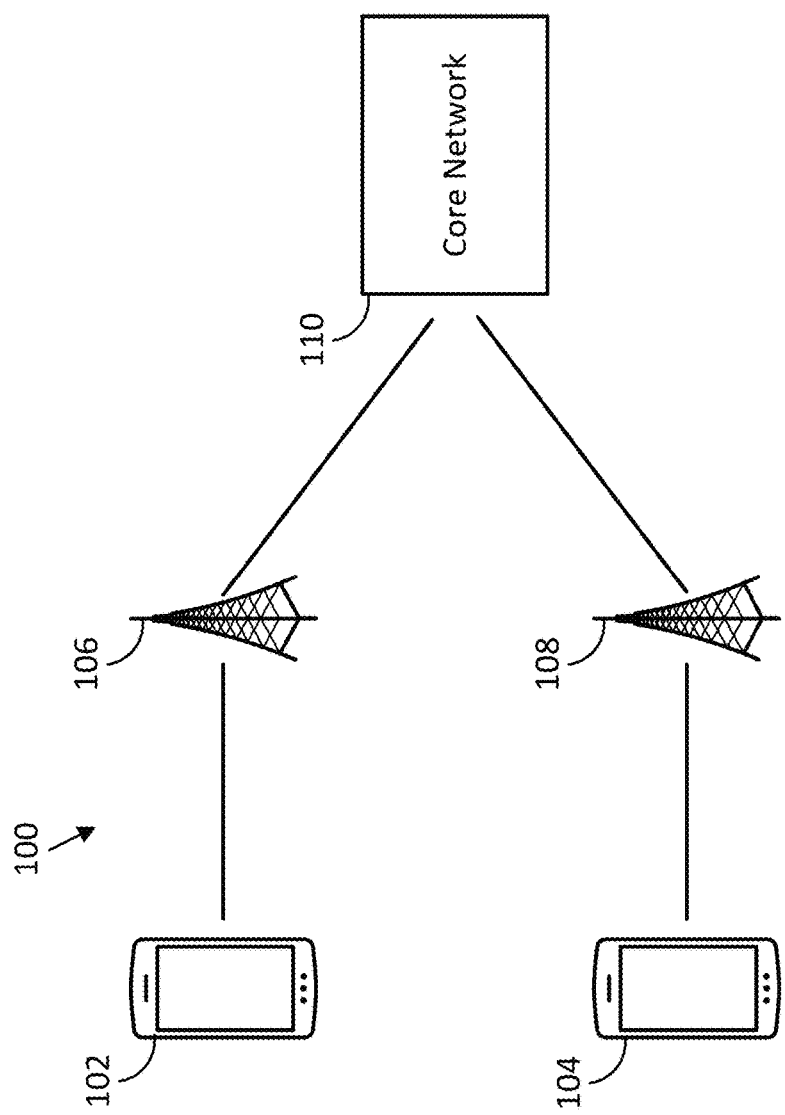
FIG. 1 illustrates an example network arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

As used throughout this application, the terminology of "drop a call" or "a dropped call" refers to a termination of a call that was not initiated by users of UEs involved with the call. For example, "drop a call" or "a dropped call" may refer to a call terminated by a network servicing the call and/or one or both of the UEs losing connection with the network servicing the call.

Call collision is a major challenge that a majority of the public face in real world. Call collision occurs when two users call each other at the same time (or within a processing time for a call) and the calls get dropped at both ends due to the fact that both users are busy. For example, in legacy UE technology, a UE may attempt to initiate a phone call to a second UE and may receive an indication that the second UE is busy if the second UE is already on a call with another UE or is in the process of attempting to connect with another UE. In response to receiving the indication that the second UE is busy, the UE may drop the call. When two UEs are calling each other, both UEs may indicate that they are busy and both UE may drop the call. Accordingly, the call may not be completed between the two UEs due to each of the UEs detecting the indication of being busy received the other UE. As per legacy specification or state-of-art implementation, there is no method to resolve the conflict even if both the calls intends to call same destinations. This will cause a bad user experience.

FIG. 1 illustrates an example network arrangement 100 in accordance with some embodiments. In particular, the network arrangement 100 that may facilitate a call between a first UE 102 and a second UE 104. The illustrated embodiment illustrates a wireless network, although it should be understood that the embodiments described herein may be any type of network that facilitates calls between UEs.

The network arrangement 100 may include the first UE 102 and the second UE 104. The first UE 102 and the second UE 104 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-internet-of-things (IoT) devices. The first UE 102 may be associated with a first user and the second UE 104 may be associated with a second user. The first user may utilize the first UE 102 and the second user may utilize the second UE 104 to complete a call between the first UE 102 and the second UE 104.

The network arrangement 100 may further include a first NodeB 106 and a second NodeB 108. The first NodeB 106 and the second NodeB 108 may comprise a NodeB, an enhanced NodeB (eNB), a next generation NodeB (gNB), or another type of NodeB. The first NodeB 106 and the second NodeB 108 may be part of a network to provide service for calls between the first UE 102 and the second UE 104. The UEs may establish wireless connections with the NodeBs. In the illustrated embodiment, the first UE 102 may establish a connection to the first NodeB 106 and the second UE 104 may establish a connection to the second NodeB 108. In other embodiments, the first UE 102 and the second UE 104 may establish a connection to a same NodeB or to different NodeBs. Once the UEs have established connections with the NodeBs, the UEs and the NodeBs may exchange communications.

The network arrangement 100 may further include a core network (CN) 110. In some embodiments, the CN may comprise a fifth generation core network (5GC). The CN 110 may be connected to the NodeBs, such as the first NodeB 106 and the second NodeB 108 in the illustrated embodiment. For example, the CN 110 may be wiredly connected to the NodeBs (such as via a fiber optic backhaul), wirelessly connected to the NodeBs (such as via a wireless backhaul), or some combination thereof. The CN 110 may include CN interface circuitry (such as the CN interface circuitry 1112 (FIG.11)) that facilitates communication between the CN 110 and the NodeBs.

The network illustrated in the network arrangement 100 may facilitate a call between the first UE 102 and the second UE 104. In particular, one of the UEs may operate as an originator of the call (where the originator initiates the call)

and the other of the UEs may operate as a termination of the call (where the termination accepts or rejects the call initiated by the originator). For clarity, the following description will describe the first UE 102 as the originator of a call and the second UE 104 as the termination of the call.

The first UE 102 may initiate a call with the second UE 104 in response to a user of the first UE 102 indicating that the first UE 102 is to call the second UE 104. The user of the first UE 102 may indicate that the first UE 102 is to call the second UE 104 by providing an identifier associated with the second UE 104 (such as entering a phone number, or selecting a stored phone number or contact) at the first UE 102 and interacting with first UE 102 (such as selecting button that initiates a call or providing a command to initiate a call) to indicate a call is to be initiated. The first UE 102 may establish a connection with the first NodeB 106 for the call. For example, a radio resource control (RRC) connection setup may be performed to establish a connection between the first UE 102 and the first NodeB 106. Further, the CN 110 may set up a quality of service (QoS) flow for the first UE 102 to carry session initiation protocol (SIP) signaling and the first NodeB 106 may set up a data radio bearer (DRB) for the first UE 102 for the call.

Based on the initiation of the call by the first UE 102, a connection may be established between the second UE 104 and the second NodeB 108. For example, an RRC connection setup may be performed to establish a connection between the second UE 104 and the second NodeB 108. Further, the CN 110 may set up a QoS flow for the second UE 104 to carry SIP signaling and the second NodeB 108 may set up a DRB for the second UE 104 for the call.

Once SIP negotiation is successful, the CN 110 may set up a QoS flow for the first UE 102 to carry real-time transport protocol (RTP) and real-time control protocol (RTCP) data flows for the first UE 102. Further, the CN 110 may set up a QoS flow for the second UE 104 to carry RTP and RTCP data flows once the SIP negotiation is successful. The CN 110 may further set up DRBs for the first UE 102 and the second UE 104 for the call.

The first UE 102 and the second UE 104 may then exchange information related to the call. For example, the second UE 104 may provide an alert to the first UE 102 indicating that the second UE 104 has received the call request from the first UE 102. The second UE 104 may provide an acceptance of the call (for example, establish the call between the first UE 102 and the second UE 104) or a rejection of the call (for example, a busy message due to the second UE 104 being unable to connect the call). If the call is accepted, the first UE 102 and the second UE 104 may exchange voice frames via the connections with the NodeBs and the CN 110 for the call.

The call may be terminated at some point and the resources for the call may be released. For example, the call may be terminated based on a user of the first UE 102 indicating that the call is to be terminated, a user of the second UE 104 indicating that the call is to be terminated, the network (including the first NodeB 106, the second NodeB 108 and the CN 110) terminating the call, or some combination thereof. In some embodiments, the call may be terminated due to the first UE 102 losing connection with the first NodeB 106 and/or the second UE 104 losing connection with the second NodeB 108. The UEs may release the QoS flows for the call and the NodeBs may release the DRBs based on the termination of the call.

While a particular network and particular procedure for a call is described in relation to FIG. 1, it should be understood that embodiments described herein are not limited to the particular network and/or the particular procedure described in relation to FIG. 1. In particular, the embodiments described herein may be implemented by networks and/or procedures that facilitate calls between UEs.

Figure 2:
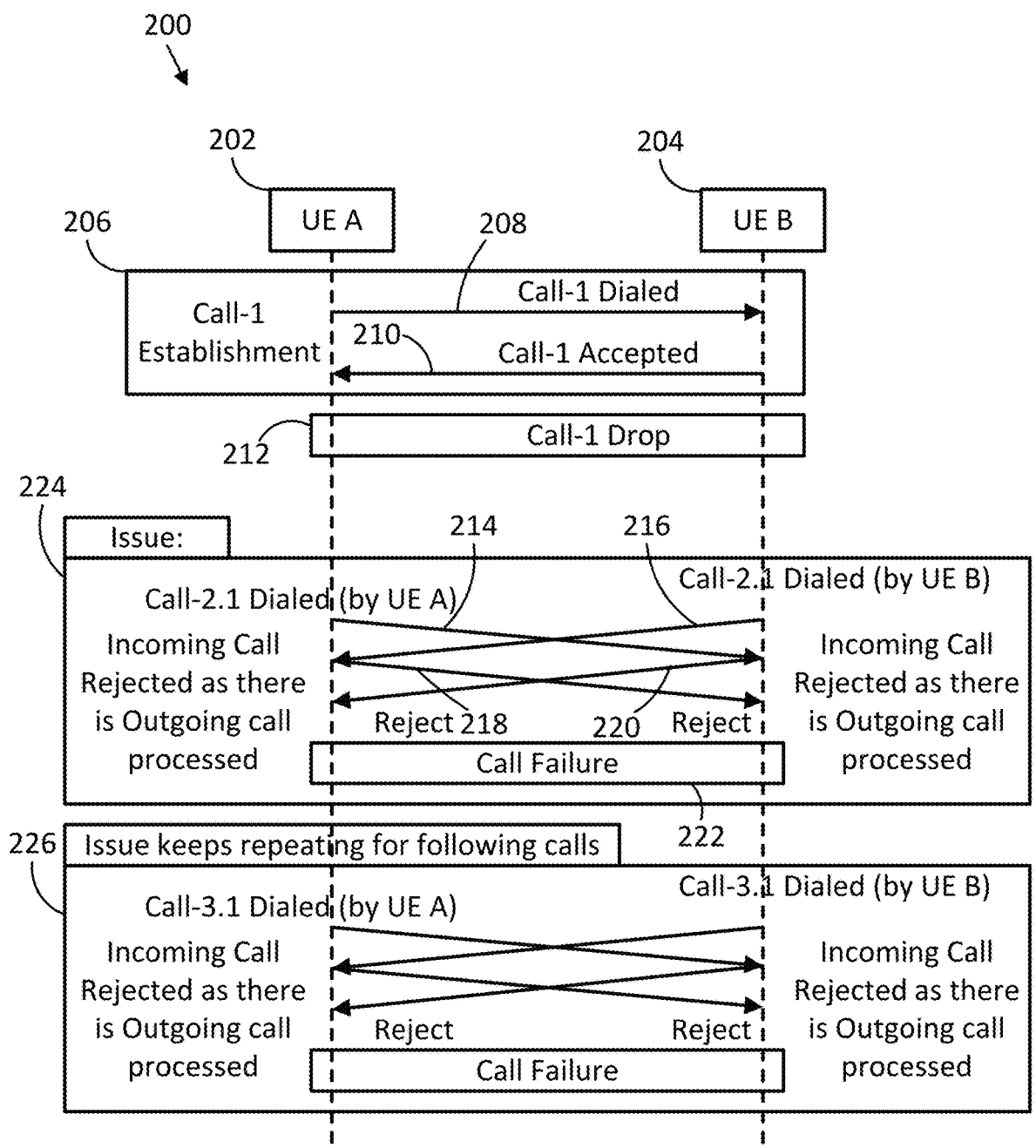
FIG. 2 illustrates an example call flow in accordance with some embodiments.

FIG. 2 illustrates an example call flow 200 in accordance with some embodiments. The call flow 200 illustrates example call collisions that may occur during establishment of calls between a first UE 202 and a second UE 204. The first UE 202 and the second UE 204 may include one or more features of the first UE 102 (FIG. 1) and/or the second UE 104 (FIG. 1).

In the call flow 200, a first call 206 may be established between the first UE 202 and the second UE 204. For example, the first call 206 may include the first UE 202 dialing the second UE 204 as part of an outgoing call in 208. The dialing by the first UE 202 in 208 may include one or more messages transmitted between the first UE 202 and the second UE 204 that indicate the first UE 202 has initiated the first call 206 to the second UE 204 and/or the second UE 204 has received one or more signals related to the first call 206. In response to the dialing in 208 being received by the second UE 204, the second UE 204 may accept the first call 206 initiated by the first UE 202 in 210. The acceptance in 210 of the call by the second UE 204 may establish the first call 206 between the first UE 202 and the second UE 204.

In the call flow 200, the first call 206 may be dropped in 212. In particular, the first call 206 may be terminated in 212 that was not initiated by the user of the first UE 202 nor the user of the second UE 204. For example, the first call 206 between the first UE 202 and the second UE 204 may be terminated by a network servicing the first call 206 and/or one or both of the first UE 202 and the second UE 204 losing connection with the network.

Based on the first call 206 being dropped in 212, the first UE 202 and the second UE 204 may attempt to initiate a call with each other. For example, suppose there was a call-drop, then the first action that may be done by both caller and callee is to dial each other, but often it lands to unsuccessful call attempts by both side due to fact that each other is busy calling (in fact same peers). This may lead to major frustration and bad user experience. In particular, the first UE 202 may dial the second UE 204 as part of an outgoing call from the first UE 202 in 214 at approximately the same time the second UE 204 may dial the first UE 202 as part of an outgoing call from the second UE 204 in 216. For example, the dialing by the first UE 202 in 214 may occur prior to a time that the first UE 202 detects the dialing of 216 and the dialing by the second UE 204 in 216 may occur prior to a time that the second UE 204 detects the dialing of 214.

The dialing by a UE may initiate a connection process for establishing a call between the UEs. The UE may be unable to accept an incoming call during the connection process. In some embodiments, the connection process may extend from a time when the UE initiates the dialing to a time when the call causes the other UE to ring. For example, the first UE 202 may detect the dialing of 216 during a connection process initiated by the dialing of 214. Due to the first UE 202 detecting the dialing of 216 during the connection process, the first UE 202 may reject the incoming call and provide an indication of the rejection to the second UE 204 in 218. The second UE 204 may detect the dialing of 214 during a connection process initiated by the dialing of 216. Due to the second UE 204 detecting the dialing of 214 during the connection process, the second UE 204 may reject the incoming call and provide an indication of the rejection to the first UE 202 in 220. Due to both the first UE 202 and the second UE 204 rejecting the incoming calls, the second call 224 may fail in 222.

The user of the first UE 202 and the user of second UE 204 may request further calls to each other. Based on the user requests, the first UE 202 and the second UE 204 may attempt to establish a third call 226. The procedure associated with the third call 226 may include one or more of the features of the procedure associated with the second call 224. In particular, the first UE 202 and the second UE 204 may perform the procedures of the second call 224 in the third call 226. The third call 226 may fail based on the first UE 202 and the second UE 204 attempting to initiate the third call 226 at approximately the same time. In particular, the first UE 202 may dial the second UE 204 at approximately the same time that the second UE 204 dials the first UE 202, which may cause the third call 226 to fail. Further calls may continue to fail if the user of the first UE 202 and the user of the second UE 204 continue to request calls to each other at the same time, such as occurs with the second call 224 and the third call 226.

Figure 3:
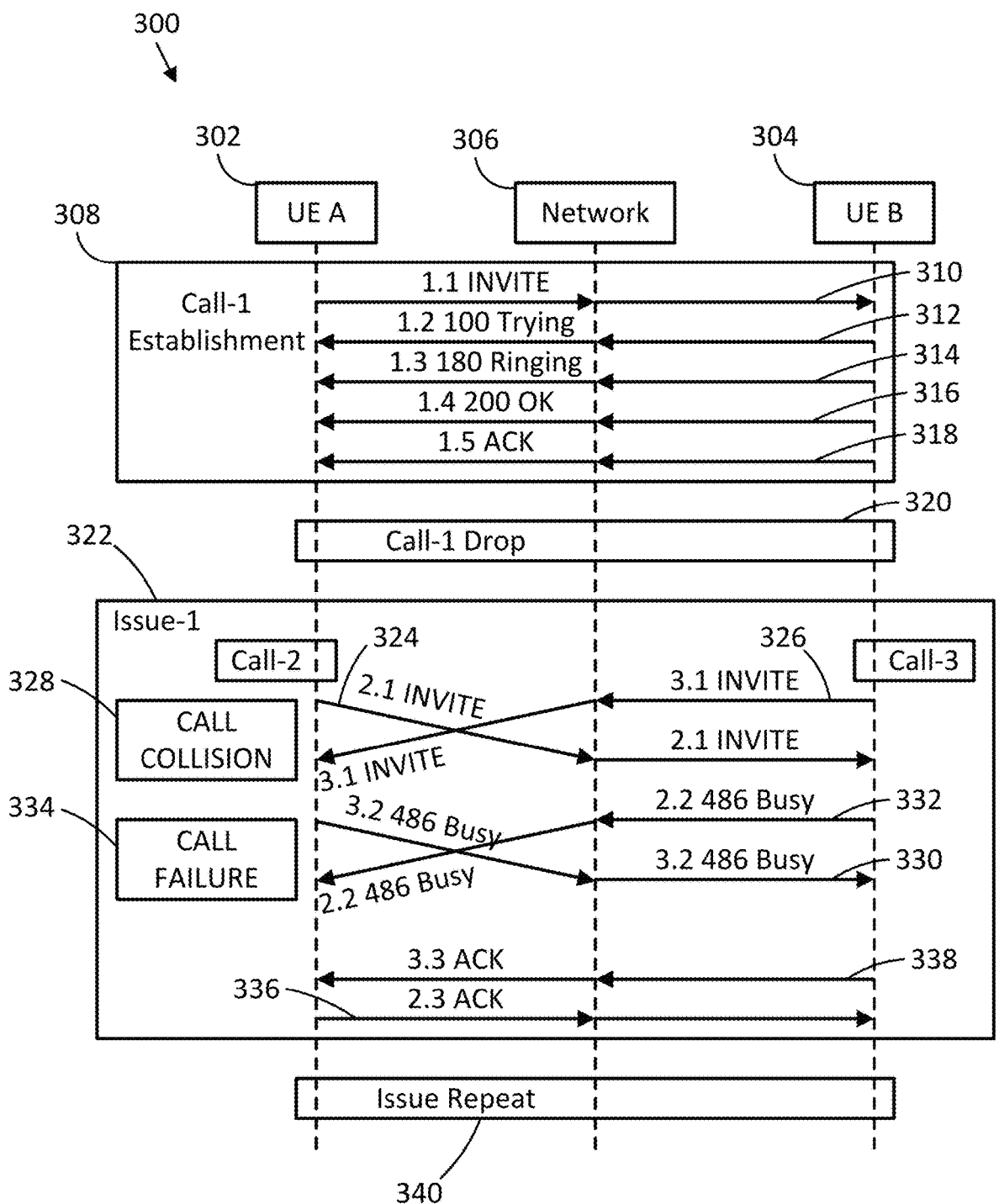
FIG. 3 illustrates another example call flow illustrating call failure in accordance with some embodiments.

FIG. 3 illustrates another example call flow 300 illustrating call failure in accordance with some embodiments. The call flow 300 illustrates an example call collision that may occur during establishment of calls between a first UE 302 and a second UE 304. The call flow 300 illustrates example messages that may be exchanged among the first UE 302, the second UE 304, and a network 306 as part of call establishment between the first UE 302 and the second UE 304 as part of a voice over long term evolution (VoLTE) standard. The first UE 302 and the second UE 304 may include one or more of the features of the first UE 102 (FIG. 1) and/or the second UE 104 (FIG. 1). The network 306 may include one or more of the features of the network described in relation to the network arrangement 100 (FIG. 1). In particular, the network 306 may include one or more NodeBs, where each of the NodeBs may include one or more of the features of the first NodeB 106 (FIG. 1) and/or the second NodeB 108 (FIG. 1). The network 306 may further include a CN, where the CN includes one or more of the features of the CN 110 (FIG. 1).

The call flow 300 may include a first call 308 established between the first UE 302 and the second UE 304. The first call 308 may be initiated by the first UE 302. In particular, a user of the first UE 302 may request that the first UE 302 establish the first call 308 with the second UE 304. The first UE 302 may transmit an invite message 310 to the network 306 as part of an outgoing call from the first UE 302 to indicate that the first UE 302 is attempting to establish the first call 308 with the second UE 304. The network 306 may forward the invite message to the second UE 304.

The second UE 304 may detect the invite message 310 received from the first UE 302. The second UE 304 may begin processing the invite message 310 in response to detecting the invite message 310. The second UE 304 may transmit a trying message 312 to the network 306 to indicate that the second UE 304 is processing the invite message 310. The network 306 may forward the trying message 312 to the first UE 302.

The second UE 304 may begin ringing to indicate to a user of the second UE 304 that the first call 308 is attempting to be established. The second UE 304 may begin ringing based on the processing of the invite message 310. The second UE 304 may transmit a ringing message 314 to the network 306 to indicate that the second UE 304 is ringing. The network 306 may forward the ringing message 314 to the first UE 302.

The second UE 304 may detect an indication from the user of the second UE 304 that the user would like to accept the first call 308. Based on the indication, the second UE 304 may establish the first call 308 with the first UE 302. The second UE 304 may transmit an OK message 316 to the network 306 to indicate that the first call 308 has been accepted by the second UE 304. The network 306 may forward the OK message 316 to the first UE 302.

The second UE 304 may transmit an acknowledgement (ACK) message 318 to the network 306 once the first call 308 has been established. The ACK message 318 may indicate that the ACK message 318 is the last response to the invite message 310. In particular, the ACK message 318 may indicate that the second UE 304 has completed the responses to the invite message 310. For example, the ACK message 318 may indicate that the second UE 304 will not be sending any further response messages based on the invite message 310.

In the call flow 300, the first call 308 may be dropped in 320. In particular, the first call 308 may be terminated in 320, where the termination was not initiated by the user of the first UE 302 nor the user of the second UE 304. For example, the first call 308 between the first UE 302 and the second UE 304 may be terminated by a network servicing the first call 308 and/or one or both of the first UE 302 and the second UE 304 losing connection with the network.

Based on the first call 308 being dropped in 320, the first UE 302 and the second UE 304 may attempt to initiate another call with each other. The first UE 302 and the second UE 304 may attempt to initiate a second call 322 to each other based on a user of the first UE 302 requesting a call being initiated to the second UE 304 and a user of the second UE 304 requesting a call being initiated to the first UE 302.

The first UE 302 may transmit an invite message 324 to the network 306 as part of an outgoing call from the first UE 302 to attempt to establish the second call 322. The network 306 may forward the invite message 324 to the second UE 304. At approximately the same time, the second UE 304 may transmit an invite message 326 to the network 306 as part of an outgoing call from the second UE 304 to attempt to establish the second call 322. The network 306 may forward the invite message 326 to the first UE 302. A delay may exist between the time that the invite message 324 is sent by the first UE 302 and a time that the invite message 324 arrives at the second UE 304. Further, a delay may exist between a time that the second UE 304 receives the invite message 324 and a time that the second UE 304 acts in response to the invite message 324 due to processing of the invite message 324 by the second UE 304. The delays may correspond to a connection process for the invite message 324 for VoLTE. A delay may exist between the time that the invite message 326 is sent by the second UE 304 and a time that the invite message 326 arrives at the first UE 302. Further, a delay may exist between a time that the first UE 302 receives the invite message 326 and a time that the first UE 302 acts in response to the invite message 326 due to processing of the invite message 326 by the first UE 302. The delays may correspond to a connection process for the invite message 326 for VoLTE. The invite message 324 and the invite message 326 being transmitted at approximately the same time may refer to the invite message 324 being transmitted at a time such that the invite message 324 is received at the second UE 304 during the connection process for the invite message 326 and the invite message 326 being transmitted at a time such that the invite message 326 is received at the first UE 302 during the connection process for the invite message 324. The invite message 324 and the invite message 326 being transmitted at approximately the same time may result in a call collision 328.

The first UE 302 and the second UE 304 may be unable to accept incoming calls received during the connection processes for outgoing calls. Accordingly, the first UE 302 may be unable to accept the invite message 326 within the connection process for the invite message 324. As the first UE 302 receives the invite message 326 during the connection process for the invite message 324 in the illustrated embodiment, the first UE 302 may reject incoming call associated with the invite message 326 and may transmit a busy message 330 to the network 306 to indicate the incoming call has been rejected. The network 306 may forward the busy message 330 to the second UE 304. The second UE 304 may terminate the attempt of the second UE 304 to establish the second call 322 in response to receiving the busy message 330.

The second UE 304 may be unable to accept the invite message 324 within the connection process for the invite message 326. As the second UE 304 receives the invite message 324 within the connection process for the invite message 326 in the illustrated embodiments, the second UE 304 may reject the incoming call associated with the invite message 324 and may transmit a busy message 332 to the network 306 to indicate the incoming call has been rejected. The network 306 may forward the busy message 332 to the first UE 302. The first UE 302 may terminate the attempt of the first UE 302 to establish the second call 322 in response to receiving the busy message 332. As the first UE 302 and the second UE 304 terminate the attempts to establish the second call 322, the second call 322 may result in a call failure 334.

The first UE 302 may detect the busy message 332 received from the second UE 304. In response to detecting the busy message 332, the first UE 302 may transmit an ACK message 336 to the network 306 to indicate that the first UE 302 terminated the attempt to establish the second call 322. The network 306 may forward the ACK message 336 to the second UE 304. Additionally, the second UE 304 may detect the busy message 330 received from the first UE 302. In response to detecting the busy message 330, the second UE 304 may transmit an ACK message 338 to the network 306 to indicate that the second UE 304 terminated the attempt to establish the second call 322. The network 306 may forward the ACK message 338 to the first UE 302. Based on the second call 322 failing, a user of the first UE 302 and a user of the second UE 304 may request further calls at approximately the same time, which may result in further failed calls (which may repeat the procedure described in relation to the second call 322) in 340.

Figure 4:
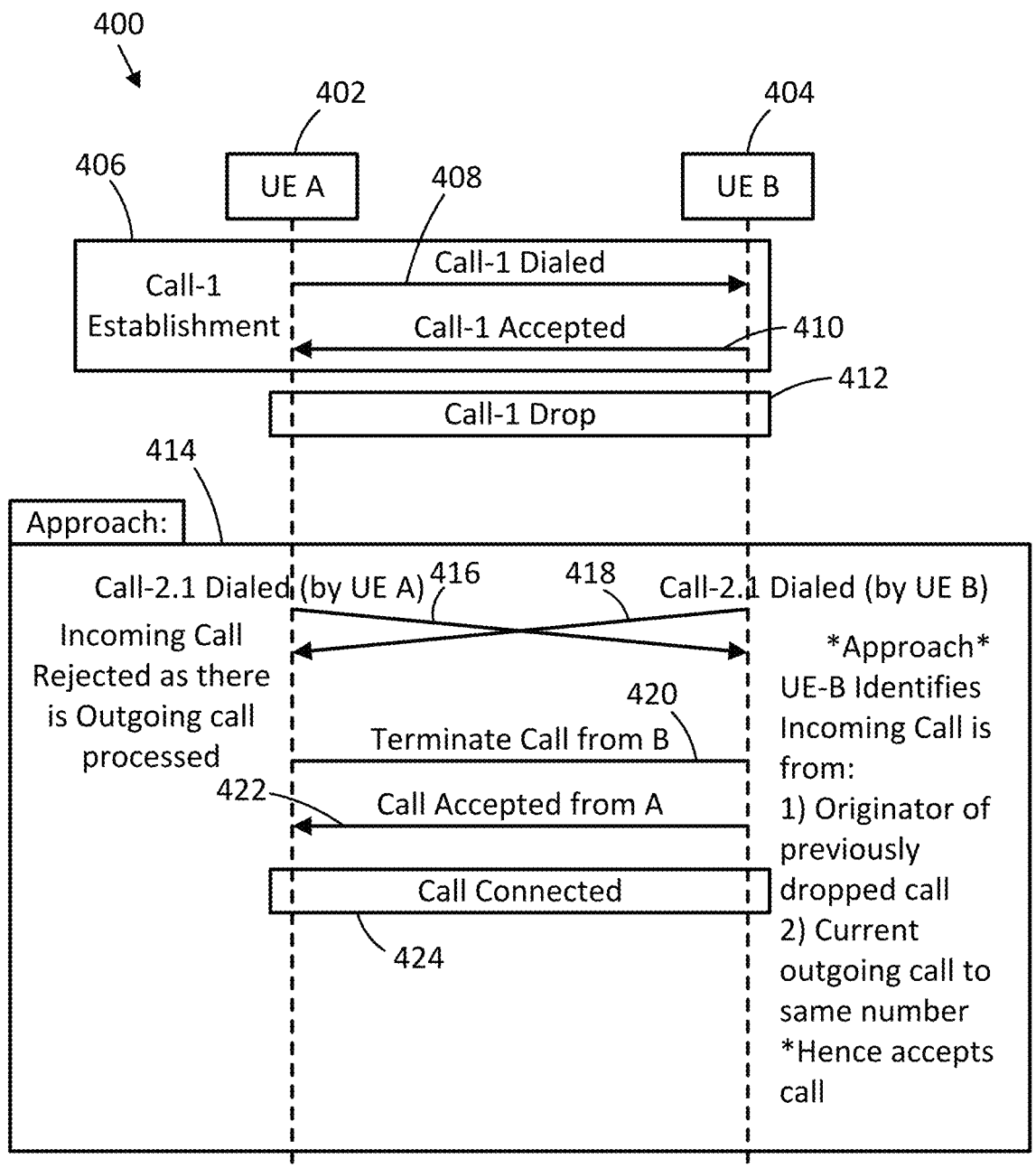
FIG. 4 illustrates an example call flow that resolves call collision in accordance with some embodiments.

FIG. 4 illustrates an example call flow 400 that resolves call collision in accordance with some embodiments. The call flow 400 illustrates an example call collision that may occur during establishment of calls between a first UE 402 and a second UE 404. The call flow 400 illustrate example messages that may be exchanged among the first UE 402 and the second UE 404 as part of a call establishment between the first UE 402 and the second UE 404. The first UE 402 and the second UE 404 may include one or more of the features of the first UE 102 (FIG. 1) and/or the second UE 104 (FIG. 1). FIG. 4 illustrates one scenario where one call getting dropped, following a call collision scenario where the second UE 404 (which may be referred to as UE-B) may be able to resolve it with the approaches described herein. For example, the call flow 400 may illustrate call collision resolution after call drop on mobile terminating (MT) UE.

The call flow 400 may include a first call 406 established between the first UE 402 and the second UE 404. The first call 406 may be initiated by the first UE 402. Accordingly, the first UE 402 may be the originator of the first call 406 and the second UE 404 may be the terminator of the first call 406. A user of the first UE 402 may request that the first UE 402 establish the first call 406 with the second UE 404. The first UE 402 may dial the second UE 404 as part of an outgoing call from the first UE 402 in 408. In particular, the first UE 402 may transmit a message to the second UE 404 in 408 requesting establishment of the first call 406 with the second UE 404.

The second UE 404 may detect the message received from the first UE 402 in 408 requesting establishment of the first call 406. The second UE 404 may determine whether the second UE 404 is available for a call in response to the message. In the illustrated embodiment, the second UE 404 may determine that the second UE 404 can accept a call. The second UE 404 may ring to indicate the incoming call to a user of the second UE 404. The second UE 404 may detect an interaction from the user of the second UE 404 indicating that the user accepts the call. The second UE 404 may transmit an acceptance message to the first UE 402 in 410 indicating that the second UE 404 accepts establishment of the first call 406. The first call 406 may be established between the first UE 402 and the second UE 404 based on the acceptance message of 410.

Although the embodiment above described the second UE 404 terminating the outgoing call based on the second UE 404 being the terminator of the first call 406, it should be understood that the UE that terminates the outgoing call may be the originator of the previous call in other embodiments.

In the call flow 400, the first call 406 may be dropped in 412. For example, the first UE 402 (which may be referred to as UE-A) may call the second UE 404 (which may be referred to as UE-B) and, after picking call, call got dropped. In particular, the first call 406 may be terminated in 412, where the termination was not initiated by the user of the first UE 402 nor the user of the second UE 404. For example, the first call 406 between the first UE 402 and the second UE 404 may be terminated by a network servicing the first call 406 and/or one or both of the first UE 402 and the second UE 404 losing connection with the network.

Based on the first call 406 being dropped in 412, the first UE 402 and the second UE 404 may attempt to initiate another call with each other. The first UE 402 and the second UE 404 may attempt to initiate a second call 414 to each other based on a user of the first UE 402 requesting a call being initiated to the second UE 404 and a user of the second UE 404 requesting a call being initiated to the first UE 402. For example, now the first UE 402 (which may be referred to as UE-A) may dial the second UE 404 (which may be referred to as UE-B), and the second UE 404 (UE-B) may dial the first UE 402 (UE-A) (for example, call collision may occur).

The first UE 402 may dial the second UE 404 as part of an outgoing call from the first UE 402 in 416 based on the request of the user of the first UE 402 to establish the second call 414 with the second UE 404. At approximately the same time, the second UE 404 may dial the first UE 402 as part of an outgoing call from the second UE 404 in 418 based on the request of the user of the second UE 404 to establish the second call 414 with the first UE 402. A delay may exist between a time that the first UE 402 dials the second UE 404 and a time that the second UE 404 detects and/or processes the dialing from the first UE 402. The delay may correspond to a connection process for the dialing by the first UE 402 in 416. Further, a delay may exist between a time that the second UE 404 dials the first UE 402 and a time that the first UE 402 detects and/or processes the dialing from the second UE 404. The delay may correspond to a connection process for the dialing by the second UE 404 in 418. The dialing by the first UE 402 and the dialing by the second UE 404 being at approximately the same time may refer to the dialing by the first UE 402 being detected by the second UE 404 during the connection process for the dialing by the second UE 404 and the dialing by the second UE 404 being detected by the first UE 402 during the connection process for the dialing by the first UE 402.

The first UE 402 and the second UE 404 may be unable to accept incoming calls received during the connection process for outgoing calls. Accordingly, the first UE 402 may be unable to accept the call from the second UE 404 corresponding to the dialing in 418 within the connection process for the dialing in 416. Further, the second UE 404 may be unable to accept the call from the first UE 402 corresponding to the dialing in 416 within the connection process for the dialing in 418.

However, on a call, UE may not voluntarily reject call without considering source(number) of incoming call and outgoing call which is in progress in the illustrated embodiment. Instead devices can have more intelligence and resolve conflict with solutions provided as below. In particular, rather than the first UE 402 and the second UE 404 rejecting the incoming calls corresponding to the dialing in 416 and the dialing in 418, one or both of the first UE 402 and the second UE 404 may consider the source of the incoming calls corresponding to the dialing in 416 and/or the dialing in 418 prior to rejecting the incoming calls. For example, the dialing in 416 and the dialing in 418 may include an identifier of the source of the dialing. In some embodiments, the identifier may comprise a phone number corresponding to the source of the dialing. For example, the dialing in 416 may include an identifier of the first UE 402 that initiated the dialing in 416. The dialing in 418 may include an identifier of the second UE 404 that initiated the dialing in 418.

When the first UE 402 receives the dialing from the second UE 404, the first UE 402 may extract the identifier of the second UE 404 from the dialing in 418. Further, when the second UE 404 receives the dialing from the first UE 402, the second UE 404 may extract the identifier of the first UE 402 from the dialing in 416. One or both of the first UE 402 and the second UE 404 may utilize the corresponding identifier to determine whether to terminate the outgoing call and/or whether to reject or accept the incoming call. In some embodiments, the first UE 402 and/or the second UE 404 may further utilize information related to a previous call (such as the first call 406) to determine whether to terminate the outgoing call and/or whether to reject or accept the incoming call. If UE is in dialing state and simultaneously receives an incoming call, incoming call source matches with destination of outgoing call, and incoming call source matches with previously stored caller identifier, UE may terminate outgoing call procedure and proceed with incoming call procedures, thus giving priority to previous call originator.

In embodiments where one of the first UE 402 or the second UE 404 determines whether to terminate the outgoing call and/or whether to reject or accept the incoming call, the UE that performs the determination may determine whether to terminate the outgoing call based on the identifier of the source and/or information of the previous call. For clarity, the following discussion will treat the second UE 404 as the UE that performs the determination whether to reject the incoming call and the first UE 402 will not perform a determination. In some embodiments, the UEs may indicate whether each of the UEs may be able to perform the determination. For example, the dialing by each of the UE may include an indication of whether the UE initiating the dialing can perform the determination. A UE that receives the dialing may utilize the indication to determine a procedure for determining whether to terminate the outgoing call and/or accept the incoming call.

In these embodiments, the first UE 402 (which may be referred to as UE-A device) which is in dialing state may reject incoming call (no additional steps required from legacy behavior). The second UE 404 (which may be referred to as UE-B device), which may have more intelligence, may know call in progress is to same number, previous call was with UE-A, and was initiated by UE-A. Hence UE-B can allow incoming call and abort outgoing call procedure. The second UE 404 may determine whether to terminate the outgoing call corresponding to the dialing 418 and/or accept the incoming call corresponding to the dialing 416 based on the identifier of the source of the incoming call. For example, the second UE 404 may extract identifier of the source from the dialing 416, which may be an identifier of the first UE 402 in the illustrated embodiment. The second UE 404 may compare the identifier of the source with an identifier of a target for the outgoing call corresponding to the dialing 418.

If the second UE 404 determines that the identifier of the source and the identifier of the target correspond to the same device (for example, the first UE 402 in the illustrated embodiment), the second UE 404 may determine that call collision exists between the first UE 402 and the second UE 404, and may terminate the outgoing call corresponding to the dialing of 418 and/or accept the incoming call corresponding to the dialing of 416. In particular, the second UE 404 may terminate the outgoing call initiated by the second UE 404 in 420. Based on the termination of the outgoing call, the second UE 404 may process the dialing from 416 and cause the second UE 404 to ring to indicate to the user of the second UE 404 that the first UE 402 is attempting to establish a call with the second UE 404. The second UE 404 may further transmit an acceptance message to the first UE in 422 to indicate that the second UE 404 accepts the call initiated by the first UE 402 based on a user of the second UE 404 indicating the call is to be accepted. The second call 414 may be established in 424 based on the acceptance of 422. If the second UE 404 determines that the identifier of the source corresponds to a different device than the identifier of the target, the second UE 404 may reject the incoming call from the first UE 402. In some embodiments, the second UE 404 may determine that the identifier of the source and the identifier of the target correspond to the same device based on the identifier of the source and the identifier of the target matching, and may determine that the identifier of the source and the identifier of the target correspond to different devices based on the identifier of the source and the identifier of the target not matching.

In embodiments where both the first UE 402 and the second UE 404 determine whether to terminate the outgoing call and/or whether to accept or reject the incoming call, the determinations by the first UE 402 and/or the second UE 404 may be based on the identification of the source of the incoming and/or the information related to a previous call. Each of the UEs may determine whether the identifier of the source for the incoming call and the identifier of the target for the outgoing call correspond to the same device. For example, the first UE 402 may compare the identifier of the source of the incoming call corresponding to the ringing of 418 to the identifier of the target of the outgoing call corresponding to the ringing of 416. If the first UE 402 determines that the identifier of the source and the identifier of the target correspond to the same device, the first UE 402 may determine that a call collision exists between the first UE 402 and the second UE 404, and may continue with determining whether to terminate the outgoing call and/or whether to accept or reject the incoming call. If the first UE 402 determines that the identifier of the source and the identifier of the target correspond to different devices, the first UE 402 may determine to reject the incoming call. In the illustrated embodiment, the first UE 402 may determine that the identifier of the source of the incoming call and the identifier of the target of the outgoing call correspond to the second UE 404.

The second UE 404 may compare the identifier of the source of the incoming call corresponding to the ringing of 416 to the identifier of the target of the outgoing call corresponding to the ringing of 418. If the second UE 404 determines that the identifier of the source and the identifier of the target correspond to the same device, the second UE 404 may determine that a call collision exists between the first UE 402 and the second UE 404, and may continue with determining whether to terminate the outgoing call and/or whether to accept or reject the incoming call. If the second UE 404 determines that the identifier of the source and the identifier of the target correspond to different device, the second UE 404 may determine to reject the incoming call. In the illustrated embodiment, the second UE 404 may determine that the identifier of the source of the incoming call and the identifier of the target of the outgoing call correspond to the first UE 402.

If the first UE 402 and the second UE 404 both determine to continue with determining whether to terminate the outgoing call and/or whether to accept or reject the incoming call, the first UE 402 and the second UE 404 may determine whether to terminate the outgoing call and/or whether to accept or reject the incoming call based on information related to the previous call. For example, the first UE 402 and/or the second UE 404 may store identifiers of one or more previous calls, and may indicate which of the identifiers correspond to originators of the previous calls and/or terminators of the previous calls. For example, on an event of call disconnect on a MT UE, the UE may store last received incoming caller identifier in some embodiments.

In the illustrated embodiment, the first UE 402 may be an originator of the first call 406 based on the first UE 402 dialing the second UE 404 in 408. The second UE 404 may be a terminator of the first call 406 based on the second UE 404 accepting the first call in 410. The first UE 402 and/or the second UE 404 may store the identifier of the first UE 402 as the originator of the first call 406. Further, the first UE 402 and/or the second UE 404 may store the identifier of the second UE 404 as the terminator of the first call 406 in some embodiments. In some embodiments, the first UE 402 and/or the second UE 404 may store the identifier of the first UE 402 and/or the identifier of the second UE 404 in response to the first call 406 being dropped in 412.

The first UE 402 and/or the second UE 404 may utilize the stored identifiers from the previous call to determine which UE is to terminate the corresponding outgoing call and which UE is to maintain the corresponding outgoing call. In particular, the first UE 402 and/or the second UE 404 may determine which UE is the originator of the first call 406 and/or which UE is the terminator of the first call 406, and may determine which UE is to terminate the corresponding outgoing call and which UE is to maintain the corresponding outgoing call based on the originator of the first call 406 and/or the terminator of the first call 406.

In the illustrated embodiment, the first UE 402 and/or the second UE 404 may determine that the UE that was the originator of the first call 406 is to maintain the corresponding outgoing call and the UE that was the terminator of the first call 406 is to terminate the corresponding outgoing call. Which of the originator and the terminator is to maintain the corresponding outgoing call and which is to terminate the corresponding outgoing call may be predefined or may be defined based on signaling between the first UE 402 and/or the second UE 404. As the first UE 402 is the originator of the first call 406 and the second UE 404 is the terminator of the first call 406 in the illustrated embodiment, the first UE 402 and/or the second UE 404 may determine that the first UE 402 is to maintain the outgoing call corresponding to the dialing in 416 and the second UE 404 is to terminate the outgoing call corresponding to the dialing in 418. Accordingly, the first UE 402 may maintain the dialing in 416 and the second UE 404 may terminate the outgoing call initiated by the second UE 404 in 420. Based on the termination of the outgoing call, the second UE 404 may process the dialing from 416 and cause the second UE 404 to ring to indicate to the user of the second UE 404 that the first UE 402 is attempting to establish a call with the second UE 404. The second UE 404 may further transmit an acceptance message to the first UE in 422 to indicate that the second UE 404 accepts the call initiated by the first UE 402 based on a user of the second UE 404 indicating that the call is to be accepted. The second call 414 may be established in 424 based on the acceptance of 422.

While the illustrated embodiment and corresponding description describe the second UE 404 terminating the outgoing call based on the second UE 404 being the terminator of the first call 406, it should be understood that the originator of the previous call may terminate the outgoing call in other embodiments. For example, the first UE 402 may terminate the outgoing call corresponding to the dialing in 416 and the second UE 404 may maintain the outgoing call corresponding to the dialing in 418 in other embodiments. An advantage of the approach described may be, this can be entirely be handled from UE and no additional network support is required. Impacts of the approach described may include, by resolving call collision, device can provide a better user experience for users, network can gain by successful call establishment (failed calls cannot be billed even though it used network resources), and/or can avoid network congestion with unsuccessful call attempts.

Figure 5:
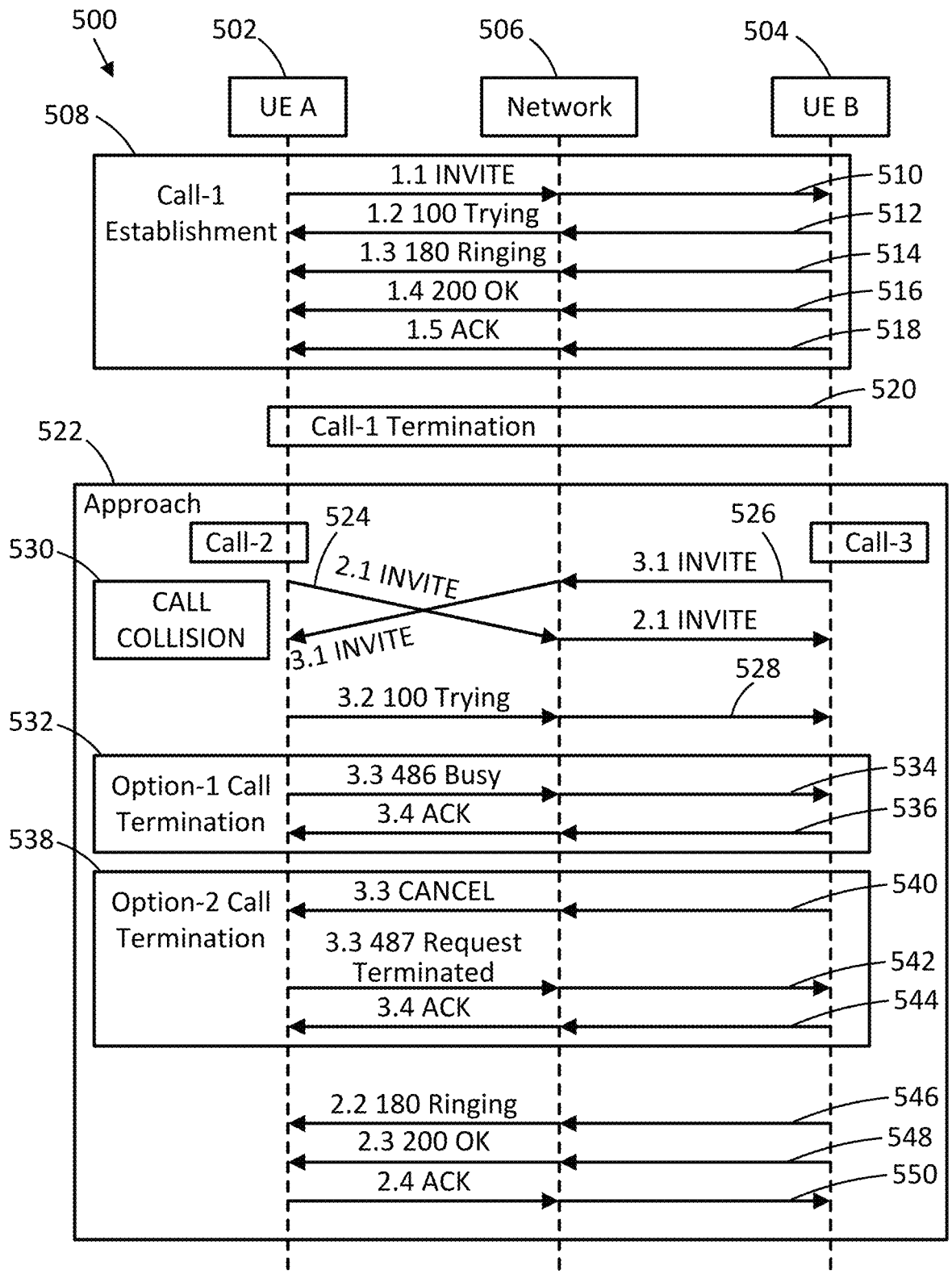
FIG. 5 illustrates another example call flow that resolves call collision in accordance with some embodiments.

FIG. 5 illustrates another example call flow 500 that resolves call collision in accordance with some embodiments. The call flow 500 illustrates an example call collision that may occur during establishment of calls between a first UE 502 and a second UE 504, where the call collision may be resolved. The call flow 500 illustrates example messages that may be exchanged among the first UE 502, the second UE 504, and a network 506 as part of call establishment between the first UE 502 and the second UE 504 as part of a VoLTE standard. The first UE 502 and the second UE 504 may include one or more of the features of the first UE 102 (FIG. 1) and/or the second UE 104 (FIG. 1). The network 506 may include one or more of the features of the network described in relation to the network arrangement 100 (FIG. 1). In particular, the network 506 may include one or more NodeBs, where each of the NodeBs may include one or more of the features of the first NodeB 106 (FIG. 1) and/or the second NodeB 108 (FIG. 1). The network 506 may further include a CN, where the CN includes one or more of the features of the CN 110 (FIG. 1). FIG. 5 illustrates one scenario where one call getting dropped, following a call collision scenario where the second UE 504 (which may be referred to as UE-B) may be able to resolve it with the approaches described herein. For example, the call flow 500 may illustrate call collision resolution after call drop on MT UE.

The call flow 500 may include a first call 508 established between the first UE 502 and the second UE 504. The first call 508 may be initiated by the first UE 502. In particular, a user of the first UE 502 may request that the first UE 502 establish the first call 508 with the second UE 504. The first UE 502 may transmit an invite message 510 to the network 506 as part of an outgoing call from the first UE 502 to indicate that the first UE 502 is attempting to establish the first call 508 with the second UE 504. The network 506 may forward the invite message to the second UE 504.

The second UE 504 may detect the invite message 510 received from the first UE 502. The second UE 504 may begin processing the invite message 510 in response to detecting the invite message 510. The second UE 504 may transmit a trying message 512 to the network 506 to indicate that the second UE 504 is processing the invite message 510. The network 506 may forward the trying message 512 to the first UE 502.

The second UE 504 may begin ringing to indicate to a user of the second UE 504 that the first call 508 is attempting to be established. The second UE 504 may begin ringing based on the processing of the invite message 510. The second UE 504 may transmit a ringing message 514 to the network 506 to indicate that the second UE 504 is ringing. The network 506 may forward the ringing message 514 to the first UE 502.

The second UE 504 may detect an indication from the user of the second UE 504 that the user would like to accept the first call 508. Based on the indication, the second UE 504 may establish the first call 508 with the first UE 502. The second UE 504 may transmit an OK message 516 to the network 506 to indicate that the first call 508 has been accepted by the second UE 504. The network 506 may forward the OK message 516 to the first UE 502.

The second UE 504 may transmit an ACK message 518 to the network 506 once the first call 508 has been established. The ACK message 518 may indicate that the ACK message 518 is the last response to the invite message 510. In particular, the ACK message 518 may indicate that the second UE 504 has completed the responses to the invite message 510. For example, the ACK message 518 may indicate that the second UE 504 will not be sending any further response messages based on the invite message 510.

In the call flow 500, the first call 508 may be dropped in 520. In particular, the first call 508 may be terminated in 520, where the termination was not initiated by the user of the first UE 502 nor the user of the second UE 504. For example, the first call 508 between the first UE 502 and the second UE 504 may be terminated by the network 506 and/or one or both of the first UE 502 and the second UE 504 losing connection with the network 506.

Based on the first call 508 being dropped in 520, the first UE 502 and the second UE 504 may attempt to initiate another call with each other. The first UE 502 and the second UE 504 may attempt to initiate a second call 522 to each other based on a user of the first UE 502 requesting a call being initiated to the second UE 504 and a user of the second UE 504 requesting a call being initiated to the first UE 502. For example, now the first UE 502 (which may be referred to as UE-A) may dial the second UE 504 (which may be referred to as UE-B), and the second UE 504 (UE-B) may dial the first UE 502 (UE-A) (for example, call collision may occur).

The first UE 502 may transmit an invite message 524 to the network 506 as part of an outgoing call from the first UE 502 to attempt to establish the second call 522. The network 506 may forward the invite message 524 to the second UE 504. At approximately the same time, the second UE 504 may transmit an invite message 526 to the network 506 as part of an outgoing call from the second UE 504 to attempt to establish the second call 522. The network 506 may forward the invite message 526 to the first UE 502.

The second UE 504 may detect the invite message 526 received from the first UE 502. The second UE 504 may begin processing the invite message 526 in response to detecting the invite message 526. The second UE 504 may transmit a trying message 528 to the network 506 to indicate that the second UE 504 is processing the invite message 526. The network 506 may forward the trying message 528 to the first UE 502.

A delay may exist between the time that the invite message 524 is sent by the first UE 502 and a time that the invite message 524 arrives at the second UE 504. Further, a delay may exist between a time that the second UE 504 receives the invite message 524 and a time that the second UE 504 acts in response to the invite message 524 due to processing of the invite message 524 by the second UE 504. The delays may correspond to a connection process for the invite message 524 for VoLTE. A delay may exist between the time that the invite message 526 is sent by the second UE 504 and a time that the invite message 526 arrives at the first UE 502. Further, a delay may exist between a time that the first UE 502 receives the invite message 526 and a time that the first UE 502 acts in response to the invite message 526 due to processing of the invite message 526 by the first UE 502. The delays may correspond to a connection process for the invite message 526 for VoLTE. The invite message 524 and the invite message 526 being transmitted at approximately the same time may refer to the invite message 524 being transmitted at a time such that the invite message 524 is received at the second UE 504 during the connection process for the invite message 526 and the invite message 526 being transmitted at a time such that the invite message 526 is received at the first UE 502 during the connection process for the invite message 524. The invite message 524 and the invite message 526 being transmitted at approximately the same time may result in a call collision 530 between the first UE 502 and the second UE 504.

The first UE 502 and the second UE 504 may be unable to accept incoming calls received during the connection process for outgoing calls. Accordingly, the first UE 502 may be unable to accept the call from the second UE 504 corresponding to the invite message 526 within the connection process for the invite message 524. Further, the second UE 504 may be unable to accept the call from the first UE 502 corresponding to the invite message 524 within the connection process for the invite message 526.

However, on a call, UE may not voluntarily reject call without considering source(number) of incoming call and outgoing call which is in progress in the illustrated embodiment. Instead devices can have more intelligence and resolve conflict with solutions provided as below. In particular, rather than the first UE 502 and the second UE 504 rejecting the incoming calls corresponding to the invite message 524 and the invite message 526, one or both of the first UE 502 and the second UE 504 may consider the source of the incoming calls corresponding to the invite message 524 and/or the invite message 526 prior to rejecting the incoming calls.

For example, at call-collision on VoLTE user equipment (UE), for the purpose of call matching, remote identifier "From" header and the "P-Asserted-Id" of MT call can be compared against "To" header of mobile MO call in progress. If either of MT call identifiers match with MO call's remote user, it can be deemed as call-collision between the same users. The invite message 524 and the invite message 526 may each include an identifier for a UE originating the call in a "From" header and an identifier for a UE terminating the call in a "To" header. The identifier for the UE originating the call may comprise a P-Asserted-Identity in some embodiments. The invite message 524 may include an identifier of the first UE 502 in the "From" header and an identifier of the second UE 504 in the "To" header based on the first UE 502 calling the second UE 504. The invite message 526 may include the identifier of the second UE 504 in the "From" header and an identifier of the first UE 502 in the "To" header based on the second UE 504 calling the first UE 502. One or both of the UEs may compare the identifier within the "To" header of an outgoing call with the identifier within the "From" header of an incoming message.

In some embodiments, one of the UEs of a call attempting to be established may perform the comparison of the identifiers whereas the other UE may not perform the comparison of the identifiers. For example, one of the UEs may be configured to perform the comparison to determine whether the call collision 530 exists while the other UE may not be configured to perform the comparison. For clarity, the following description may refer to the second UE 504 as performing the comparison while the first UE 502 does not perform the comparison. The second UE 504 may compare an identifier within the "From" header of the invite message 524 with the identifier within the "To" header of the invite message 526 to determine whether the call collision 530 exists. The second UE 504 may determine that the incoming call and the outgoing call are both between the first UE 502 and the second UE 504 based on the identifier within the "From" header of the invite message 524 and the identifier within the "To" header of the invite message 526 both corresponding to the first UE 502. In some embodiments, the second UE 504 may determine that identifiers within the "From" header and the "To" header correspond to the first UE 502 based on the identifiers matching. If the second UE 504 determines that both the identifiers correspond to first UE 502, the second UE 504 may determine that the call collision 530 exists. Based on the call collision 530 existing, the second UE 504 may terminate the outgoing call corresponding to the invite message 526. If the second UE 504 determines that the identifiers refer to different devices, the second UE 504 may reject the incoming call.

In these embodiments, the first UE 502 (which may be referred to as UE-A device) which is in dialing state may reject incoming call (no additional steps required from legacy behavior). The second UE 504 (which may be referred to as UE-B device), which may have more intelligence, may know call in progress is to same number, previous call was with UE-A, and was initiated by UE-A. Hence UE-B can allow incoming call and abort outgoing call procedure. The second UE 504 may determine whether to terminate the outgoing call corresponding to the invite message 526 and/or accept the incoming call corresponding to the invite message 524 based on the identifier of the source of the incoming call. For example, the second UE 504 may extract identifier of the source from the invite message 524, which may be an identifier of the first UE 502 in the illustrated embodiment. The second UE 504 may compare the identifier of the source with an identifier of a target for the outgoing call corresponding to the invite message 526.

In other embodiments, both of the UEs of a call attempting to be established may perform the comparison of the identifiers. For example, both of the UEs may be configured to perform the comparison to determine whether the call collision 530 exists between the UEs. For example, the first UE 502 may compare an identifier within the "To" header of the invite message 524 with an identifier within the "From" header of the invite message 526. If the first UE 502 determines that the identifier within the "To" header of the invite message 524 and the identifier within the "From" header of the invite message 526 both correspond to the second UE 504, the first UE 502 may determine that the call collision 530 exists between the first UE 502 and the second UE 504. The first UE 502 may determine that the identifiers both correspond to the second UE 504 based on the identifier within the "To" header of the invite message 524 and the "From" header of the invite message 526 matching in some embodiments. If the first UE 502 determines that the identifier within the "To" header of the invite message 524 and the identifier within the "From" header of the invite message 526 correspond to different devices, the first UE 502 may determine that the call collision 530 does not exist. If the first UE 502 determines that the call collision 530 does not exist, the first UE 502 may reject the incoming call.

The second UE 504 may compare an identifier within the "To" header of the invite message 526 with an identifier within the "From" header of the invite message 524. If the second UE 504 determines that the identifier within the "To" header of the invite message 526 and the identifier within the "From" header of the invite message 524 both correspond to the first UE 502, the second UE 504 may determine that the call collision 530 exists between the first UE 502 and the second UE 504. The second UE 504 may determine that the identifiers both correspond to the first UE 502 based on the identifier within the "To" header of the invite message 526 and the "From" header of the invite message 524 matching in some embodiments. If the second UE 504 determines that the identifier within the "To" header of the invite message 526 and the identifier within the "From" header of the invite message 524 correspond to different devices, the second UE 504 may determine that the call collision 530 does not exist. If the second UE 504 determines that the call collision 530 does not exist, the second UE 504 may reject the incoming call.

In some embodiments where the call collision 530 is determined to exist, the UEs may further utilize information related to a previous call to determine which of the UEs is to terminate a corresponding outgoing call and which of the UEs is to maintain a corresponding outgoing call. For example, the first UE 502 and/or the second UE 504 may store identifiers of one or more previous calls, and may indicate which of the identifiers correspond to originators of the previous calls and/or terminators of the previous calls. On an event of call disconnect on a MT UE, the UE may store last received incoming caller identifier in some embodiments. The first UE 502 and/or the second UE 504 ay utilize the stored identifiers to determine which UE is to terminate a corresponding outgoing call and which UE is to maintain a corresponding outgoing call.

In the illustrated embodiment, the first UE 502 may be an originator of the first call 508 based on the first UE 502 transmitting the invite message 510 for the first call 508. The second UE 504 may be a terminator of the first call 508 based on the second UE 504 transmitting the OK message 516 and/or the ACK message 518. The first UE 502 and/or the second UE 504 may store the identifier of the first UE 502 as the originator of the first call 508. Further, the first UE 502 and/or the second UE 504 may store the identifier of the second UE 504 as the terminator of the first call 508 in some embodiments. In some embodiments, the first UE 502 and/or the second UE 504 may store the identifier of the first UE 502 and/or the identifier of the second UE 504 in response to the first call 508 being dropped in 520.

The first UE 502 and/or the second UE 504 may utilize the stored identifiers from the previous call to determine which UE is to terminate the corresponding outgoing call and which UE is to maintain the corresponding outgoing call. In particular, the first UE 502 and/or the second UE 504 may determine which UE is the originator of the first call 508 and/or which UE is the terminator of the first call 508, and may determine which UE is to terminate the corresponding outgoing call and which UE is to maintain the corresponding outgoing call based on the originator of the first call 508 and/or the terminator of the first call 508.

In the illustrated embodiment, the first UE 502 and/or the second UE 504 may determine that the UE that was the originator of the first call 508 is to maintain the corresponding outgoing call and the UE that was the terminator of the first call 508 is to terminate the corresponding outgoing call. Which of the originator and the terminator is to maintain the corresponding outgoing call and which is to terminate the corresponding outgoing call may be predefined or may be defined based on signaling between the first UE 502 and/or the second UE 504. As the first UE 502 is the originator of the first call 508 and the second UE 504 is the terminator of the first call 508 in the illustrated embodiment, the first UE 502 and/or the second UE 504 may determine that the first UE 502 is to maintain the outgoing call corresponding to the invite message 524 and the second UE 504 is to terminate the outgoing call corresponding to the invite message 526. Accordingly, the first UE 502 may maintain the outgoing call corresponding to the invite message 524 and the second UE 504 may terminate the outgoing call corresponding to the invite message 526.

The approach may have two options for termination of an outgoing call by a UE based on a determination that the UE is to terminate the call. In a first option 532, the second UE 504, which was determined to terminate the outgoing call, may terminate the outgoing call associated with the invite message 526 without providing notification of the termination to the first UE 502. Further, the second UE 504 may process the invite message 524 received from the first UE 502 rather than rejecting the invite message 524 (such as by transmitting a busy message). The first UE 502 may transmit a busy message 534 to the network 506 in response to the invite message 526 based on the first UE 502 receiving the invite message 526 during a connection process for the invite message 524. The network 506 may forward the busy message 534 to the second UE 504. The second UE 504 may detect the busy message 534 received from the first UE 502 and may transmit an ACK message 536 to the network 506 in response to the detection of the busy message 534. The ACK message 536 may indicate that the second UE 504 terminated the attempt to establish the second call 522 corresponding to the invite message 526. The network 506 may forward the ACK message 536 to the first UE 502.

In a second option 538, the second UE 504, which was determined to terminate the outgoing call, may terminate the outgoing call associated with the invite message 526 and provide a notification to the first UE 502 that the outgoing call has been terminated. In particular, the second UE 504 may transmit a cancel message 540 to the network 506 to indicate that the second UE 504 has terminated the outgoing call associated with the invite message 526. The network 506 may forward the cancel message 540 to the first UE 502. The first UE 502 may detect the cancel message 540 received from the second UE 504 and may terminate the processing of the invite message 526. The first UE 502 may further transmit a request terminated message 542 to the network 506 to indicate that the first UE 502 has terminated the processing of the invite message 526. The network 506 may forward the request terminated message 542 to the second UE 504. The second UE 504 may detect the request terminated message 542 received from the first UE 502 and may transmit an ACK message 544 to the network 506 in response to the detection of the request terminated message 542. The ACK message 544 may indicate that the second UE 504 terminated the attempt to establish the second call 522 corresponding to the invite message 526. The network 506 may forward the ACK message 544 to the first UE 502.

While the illustrated embodiment and corresponding description describe the second UE 504 terminating the outgoing call based on the second UE 504 being the terminator of the first call 508, it should be understood that the originator of the previous call may terminate the outgoing call in other embodiments. For example, the first UE 502 may terminate the outgoing call corresponding to the invite message 524 and the second UE 504 may maintain the outgoing call corresponding to the invite message 526 in other embodiments.

Once the second UE 504 has terminated the outgoing call associated with the invite message 526, the call flow 500 may continue with processing of the invite message 524 and attempting to establish the second call 522 based on the invite message 524. In particular, the second UE 504 may begin ringing to indicate to a user of the second UE 504 that the second call 522 is attempting to be established. The second UE 504 may begin ringing based on the processing of the invite message 524. The second UE 504 may transmit a ringing message 546 to the network 506 to indicate that the second UE 504 is ringing. The network 506 may forward the ringing message 546 to the first UE 502.

The second UE 504 may detect an indication from the user of the second UE 504 that the user would like to accept the second call 522. Based on the indication, the second UE 504 may establish the second call 522 with the first UE 502. The second UE 504 may transmit an OK message 548 to the network 506 to indicate that the second call 522 has been accepted by the second UE 504. The network 506 may forward the OK message 548 to the first UE 502.

The second UE 504 may transmit an ACK message 550 to the network 506 once the second call 522 has been established. The ACK message 550 may indicate that the ACK message 550 is the last response to the invite message 524. In particular, the ACK message 550 may indicate that the second UE 504 has completed the responses to the invite message 524. For example, the ACK message 550 may indicate that the second UE 504 will not be sending any further response messages based on the invite message 524.

An advantage of the approach described may be, this can be entirely be handled from UE and no additional network support is required. Impacts of the approach described may include, by resolving call collision, device can provide a better user experience for users, network can gain by successful call establishment (failed calls cannot be billed even though it used network resources), and/or can avoid network congestion with unsuccessful call attempts.

Figure 6:
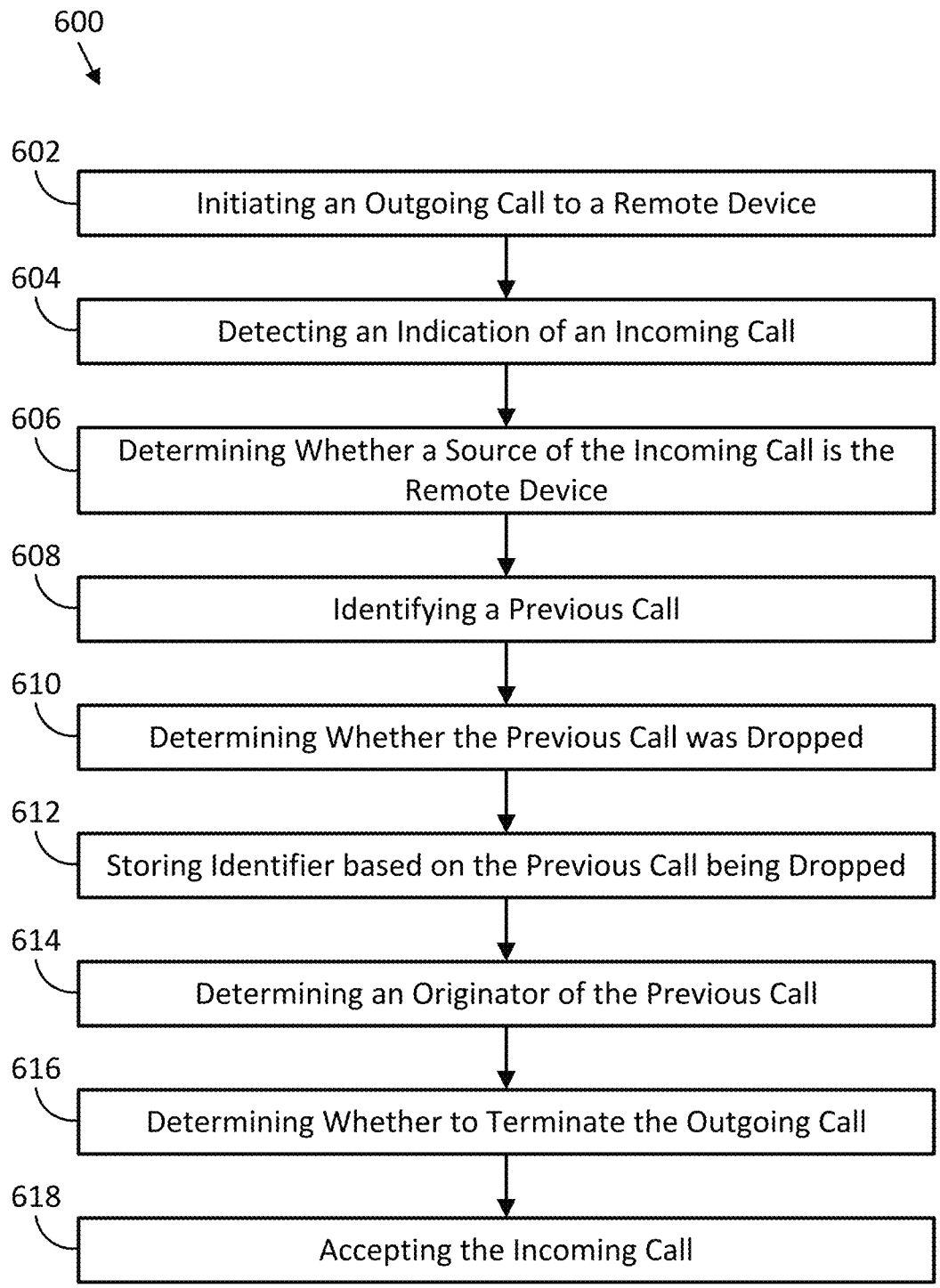
FIG. 6 illustrates an example procedure for resolving a call collision in accordance with some embodiments.

FIG. 6 illustrates an example procedure 600 for resolving a call collision in accordance with some embodiments. The procedure 600 may be performed by a UE (such as the first UE 102 (FIG. 1) and/or the second UE 104 (FIG. 1)). The procedure 600 may be performed to resolve a call collision between the UE and a remote device with which the UE is attempting to establish a call.

The procedure 600 may include initiating an outgoing call to a remote device in 602. For example, the UE may initiate an outgoing call to the remote device by dialing (such as the dialing of 416 (FIG. 4) and/or the dialing of 418 (FIG. 4)) the remote device or transmitting an invite message (such as the invite message 524 (FIG. 5) and/or the invite message 526 (FIG. 5)). The initiation of the outgoing call may cause initiation of a connection process (such as the connection processes described in relation to the call flow 400 (FIG. 4) and/or the call flow 500 (FIG. 5)) associated with the dialing and/or the transmission of the invite message.

The procedure 600 may include detecting an indication of an incoming call in 604. In particular, the UE may detect an indication of the incoming call during the connection process of the outgoing call initiated in 602. The indication of the incoming call may include detecting dialing (such as the dialing of 416 and/or the dialing of 418) or an invite message (such as the invite message 524 and/or the invite message 526) received from a source attempting to establish a call with the UE via the incoming call. In some embodiments, the indication of the incoming call may include an identifier of the source of the incoming call.

The procedure 600 may include determining whether a source of the incoming call is the remote device in 606. In particular, the UE may determine whether the source of the incoming call detected in 604 is the remote device to which the outgoing call of 602 is directed. The UE may determine whether the source is the remote device by determining whether an identifier of the source and an identifier of the remote device correspond to the same device. In some embodiments, the UE may compare the identifier of the source with the identifier of the remote device to determine whether the identifiers match. The identifier of the source and the identifier of the remote device may comprise any of the identifiers described in relation to the call flow 400 (FIG. 4) and/or the call flow 500 (FIG. 5).

The procedure 600 may include identifying a previous call in 608. In particular, the UE may identify a previous call between the UE and the remote device that occurred prior to the initiation of the outgoing call in 602. For example, the outgoing call in 602 may be a second call (such as the second call 414 (FIG. 4) and/or the second call 522 (FIG. 5)) and the previous call may be a first call (such as the first call 406 (FIG. 4) and/or the first call 508 (FIG. 5)). In some embodiments, 608 may be omitted. For example, 608 may be omitted in instances where the remote device is not configured to identify and resolve call collision in accordance with the approaches described herein.

The procedure 600 may include determining whether the previous call was dropped in 610. For example, the UE may determine whether the previous call between UE and the remote device was dropped (such as the call drop in 412 (FIG. 4) and/or the call drop in 520 (FIG. 5)). In some embodiments, 610 may be omitted. For example, 610 may be omitted in instances where the remote device is not configured to identify and resolve call collision in accordance with the approaches described herein.

The procedure 600 may include storing an identifier based on the previous call being dropped in 612. For example, the UE may store the identifier of the remote device based on the previous call being dropped. In some embodiments, 612 may be omitted. For example, 612 may be omitted in instances where the remote device is not configured to identify and resolve call collision in accordance with the approaches described herein.

The procedure 600 may include determining an originator of the previous call in 614. For example, the UE may determine the originator of the previous call, such as the originator of the first call 406 and/or the originator of the first call 508 were determined in the call flow 400 and the call flow 500, respectively. In some embodiments, the UE may determine the originator of the previous call, the terminator of the previous call, or both. The UE may determine the originator based on stored identifiers for the devices involved in the previous call, where each of the stored identifiers may be indicated as an originator of the previous call or a terminator of the previous call. In some embodiments, 614 may be omitted. For example, 614 may be omitted in instances where the remote device is not configured to identify and resolve call collision in accordance with the approaches described herein.

The procedure 600 may include determining whether to terminate the outgoing call in 616. In particular, the UE may determine whether to terminate the outgoing call initiated in 602. The UE may determine whether to terminate the outgoing call based on whether the source of the incoming call is determined to be the remote device in 606. In some embodiments, the UE may determine that the outgoing call is to be terminated based on the source of the incoming call being determined to be the remote device. In contrast, the UE may determine that the outgoing call is to be maintained based on the source of the incoming call being determined to be different than the remote device. In some embodiments, the UE may determine whether the outgoing call is to be terminated based on both the source of the incoming call being determined to be the remote device and the originator of the previous call. For example, the UE may determine that the outgoing call is to be terminated based on the source of the incoming call being determined to be the remote device and the originator of the previous call being the remote device in some embodiments. The UE may determine that the outgoing call is to be terminated in accordance with the termination of an outgoing call as described in relation to the call flow 400 (FIG. 4), the first option 532 (FIG. 5), or the second option 538 (FIG. 5). In contrast, the UE may determine that the outgoing call is to be maintained based on the source of the incoming call being determined to be different from the remote device or the UE being the originator of the previous call.

The procedure 600 may include accepting the incoming call in 618. For example, the UE may accept the incoming call in 618. The UE may accept the incoming call based on the outgoing call being terminated and/or detecting an indication from a user of the UE to accept the incoming call. In some embodiments, 618 may be omitted.

Figure 7:
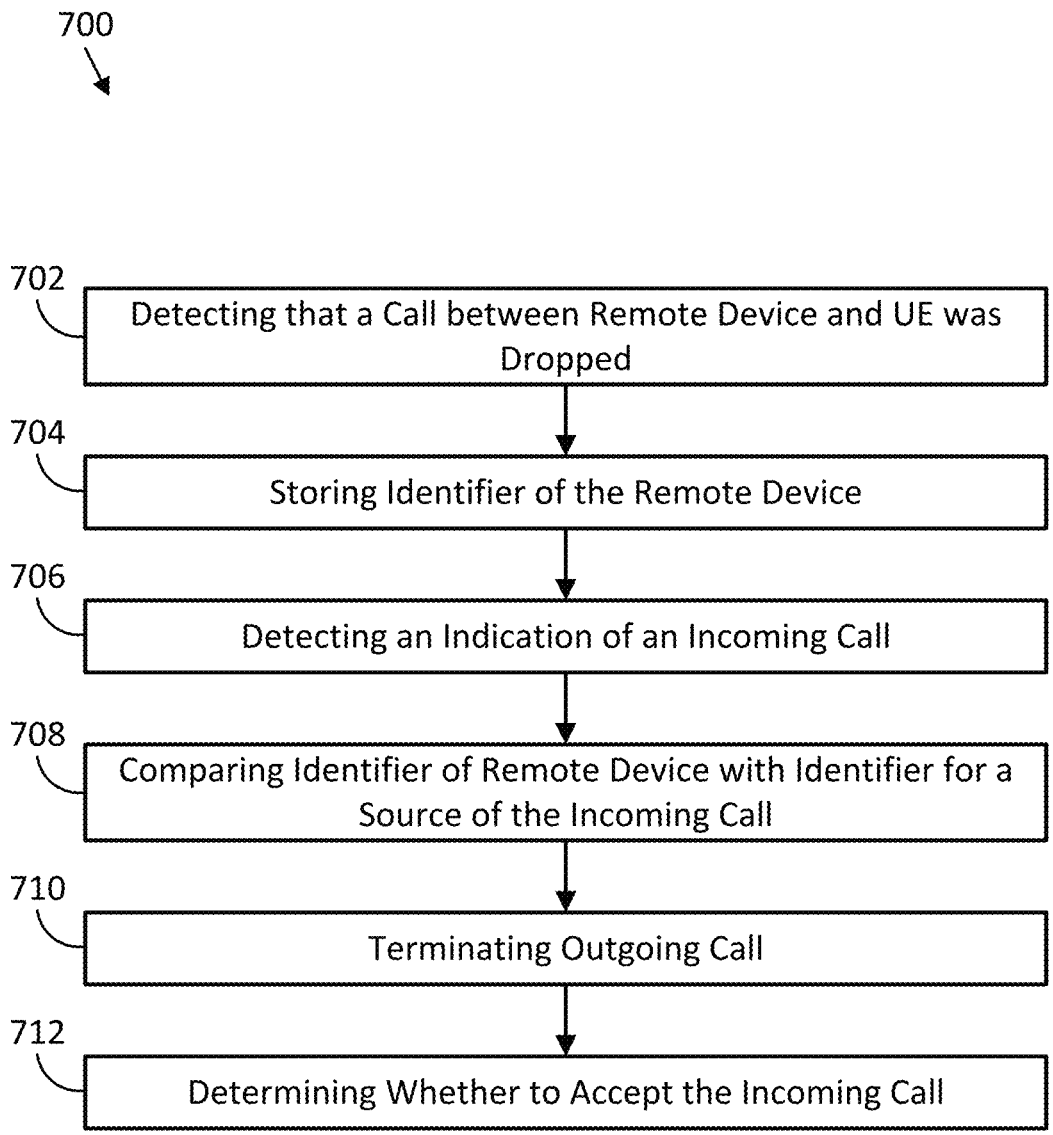
FIG. 7 illustrates an example procedure for resolving a call collision in accordance with some embodiments.

FIG. 7 illustrates an example procedure 700 for resolving a call collision in accordance with some embodiments. The procedure 700 may be performed by a UE (such as the first UE 102 (FIG. 1) and/or the second UE 104 (FIG. 1)). The procedure 700 may be performed to resolve a call collision between the UE and a remote device with which the UE is attempting to establish a call.

The procedure 700 may include detecting that a call between a remote device and a UE was dropped in 702. For example, the UE may determine that a call between UE and the remote device was dropped (such as the call drop in 412 (FIG. 4) and/or the call drop in 520 (FIG. 5)).

The procedure 700 may include storing an identifier of the remote device in 704. In particular, the UE may store an identifier of the remote device based on the detection that the UE was dropped. The identifier of the remote device may comprise any of the identifiers described in relation to the call flow 400 (FIG. 4) and/or the call flow 500 (FIG. 5). In some embodiments, the UE may further store information indicating that the identifier was associated with an originator or a terminator of the call.

The procedure 700 may include detecting an indication of an incoming call in 706. In particular, the UE may detect an indication of an incoming call during a connection process of an outgoing call from the UE. In some embodiments, the indication of the incoming call may be detected by the UE between an initiation of the outgoing call from the UE and the outgoing call ringing at the remote device. The indication of the incoming call may include detecting dialing (such as the dialing of 416 (FIG. 4) and/or the dialing of 418 (FIG. 4)) or an invite message (such as the invite message 524 (FIG. 5) and/or the invite message 526 (FIG. 5)) received from a source attempting to establish a call with the UE via the incoming call. In some embodiments, the indication of the incoming call may include an identifier of the source of the incoming call.

The procedure 700 may include comparing an identifier of the remote device with the identifier for the source of the incoming call in 708. For example, the UE may compare the identifier of the remote device from the outgoing call in 704 with the identifier for the source of the incoming call in 706.

The procedure 700 may include terminating the outgoing call in 710. For example, the UE may terminate the outgoing call based on the identifier of the remote device matching the identifier for the source of the incoming call. The identifier of the remote device matching the identifier for the source of the incoming call may indicate that both identifiers correspond to the remote device. The UE may terminate the outgoing call in accordance with the termination of an outgoing call as described in relation to the call flow 400 (FIG. 4), the first option 532 (FIG. 5), or the second option 538 (FIG. 5). In some embodiments, 710 may be omitted.

The procedure 700 may include determining whether to accept the incoming call in 712. For example, the UE may determine whether to accept the incoming call based on the comparison of the identifier of the remote device with the identifier for the source. For example, the UE may determine to accept the incoming call based on the identifier of the remote device matching the identifier for the source. In some embodiments, the UE may determine to accept the incoming call further based on an originator of the call that was dropped, a terminator of the call that was dropped, an indication to accept the incoming call from a user of the UE, or some combination thereof. In contrast, the UE may determine to reject the incoming call based on the identifier of the remote device not matching the identifier of the source.

Figure 8:
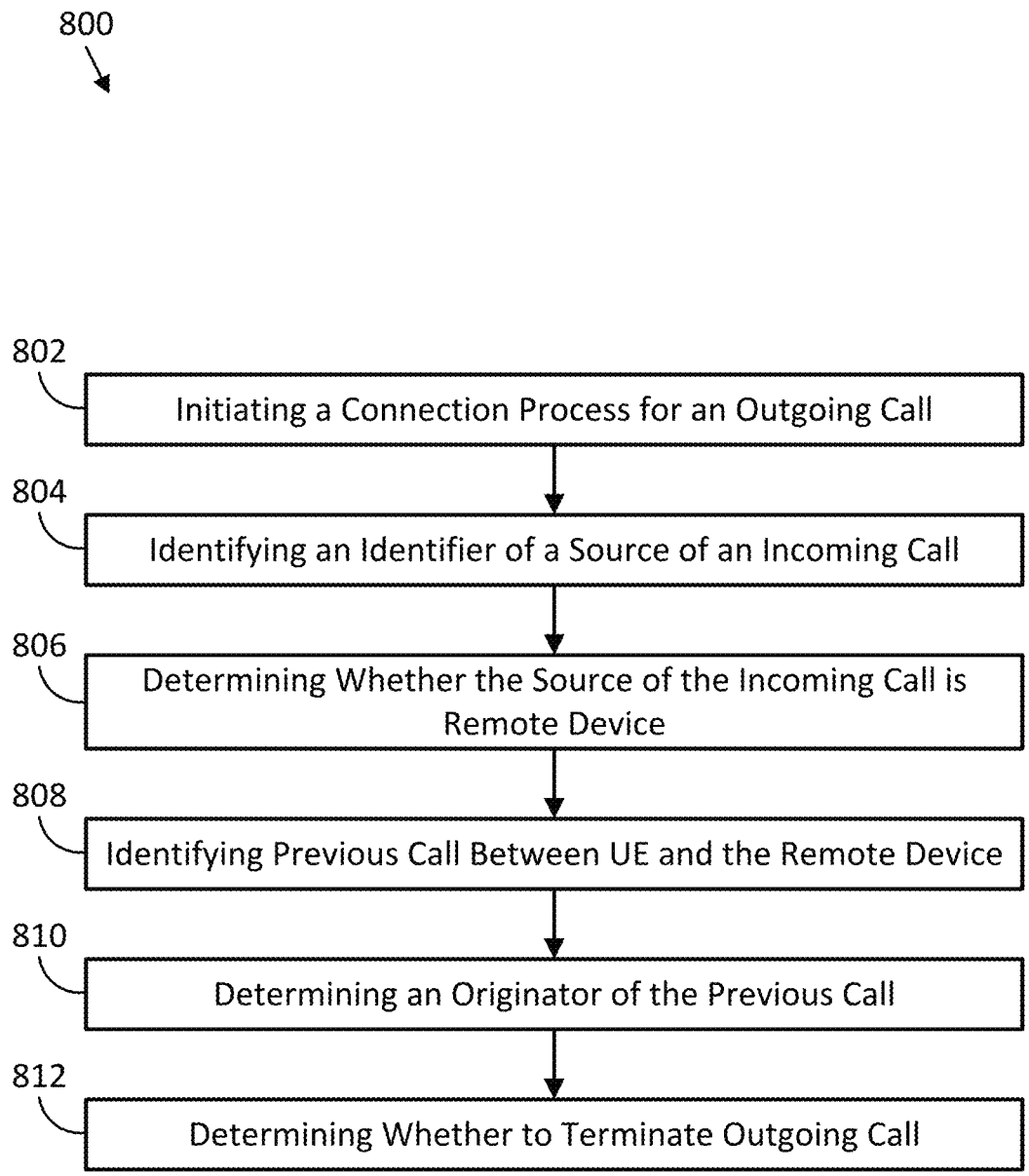
FIG. 8 illustrates an example procedure for resolving a call collision in accordance with some embodiments.

FIG. 8 illustrates an example procedure 800 for resolving a call collision in accordance with some embodiments. The procedure 800 may be performed by a UE (such as the first UE 102 (FIG. 1) and/or the second UE 104 (FIG. 1)). The procedure 800 may be performed to resolve a call collision between the UE and a remote device with which the UE is attempting to establish a call.

The procedure 800 may include initiating a connection process for an outgoing call in 802. In particular, the UE may initiate a connection process for an outgoing call to a remote device. The UE may initiate the connection process in response to detection of an indication of a user of the UE to establish a call with the remote device. Initiating the connection process may include dialing (such as the dialing of 416 (FIG. 4) and/or the dialing of 418 (FIG. 4)) the remote device or transmitting an invite message (such as the invite message 524 (FIG. 5) and/or the invite message 526 (FIG. 5)) to the remote device. The connection process may include initiating the outgoing call until causing the remote device to ring for the outgoing call. For example, the connection process may include procedures performed by the UE from a time that the UE initiates the call with the remote device until the UE causes the remote device to ring for the call.

The procedure 800 may include identifying an identifier of a source of an incoming call in 804. In particular, the UE may identify an identifier of a source of an incoming call received by the UE during the connection process initiated in 802. The identifier of the source may be included in a dialing (such as the dialing of 416 and/or the dialing of 418) the remote device or an invite message (such as the invite message 524 and/or the invite message 526) received from the source as part of a call initiated from the source to the UE.

The procedure 800 may include determining whether the source of the incoming call is the remote device in 806. In particular, the UE may determine whether the source of the incoming call is the remote device based on the identifier of the source. In some embodiments, determine whether the source of the incoming call is the remote device includes comparing the identifier of the source of the incoming call with the an identifier of the remote device to determine whether the identifier of the source matches the identifier of the remote device. The identifier of the source and the identifier of the remote device may comprise any of the identifiers described in relation to the call flow 400 (FIG. 4) and/or the call flow 500 (FIG. 5).

The procedure 800 may include identifying a previous call between the UE and the remote device in 808. In particular, the UE may identify a previous call between the UE and the remote device that was dropped that occurred prior to the initiation of the connection process in 802. For example, the outgoing call in 802 may be a second call (such as the second call 414 (FIG. 4) and/or the second call 522 (FIG. 5)) and the previous call may be a first call (such as the first call 406 (FIG. 4) and/or the first call 508 (FIG. 5)). In some embodiments, 808 may be omitted. For example, 808 may be omitted in instances where the remote device is not configured to identify and resolve call collision in accordance with the approaches described herein.

The procedure 800 may include determining an originator of the previous call in 810. For example, the UE may determine the originator of the previous call, such as the originator of the first call 406 and/or the originator of the first call 508 were determined in the call flow 400 and the call flow 500, respectively. In some embodiments, the UE may determine the originator of the previous call, the terminator of the previous call, or both. The UE may determine the originator based on stored identifiers for the devices involved in the previous call, where each of the stored identifiers may be indicated as an originator of the previous call or a terminator of the previous call. In some embodiments, 810 may be omitted. For example, 810 may be omitted in instances where the remote device is not configured to identify and resolve call collision in accordance with the approaches described herein.

The procedure 800 may include determining whether to terminate the outgoing call in 812. In particular, the UE may determine whether to terminate the outgoing call initiated in 802. The UE may determine whether to terminate the outgoing call based on whether the source of the incoming call is determined to be the remote device in 806. In some embodiments, the UE may determine that the outgoing call is to be terminated based on the source of the incoming call being determined to be the remote device. In contrast, the UE may determine that the outgoing call is to be maintained based on the source of the incoming call being determined to be different than the remote device. In some embodiments, the UE may determine whether the outgoing call is to be terminated based on both the source of the incoming call being determined to be the remote device and the originator of the previous call. For example, the UE may determine that the outgoing call is to be terminated based on the source of the incoming call being determined to be the remote device and the originator of the previous call being the remote device in some embodiments. The UE may determine that the outgoing call is to be terminated in accordance with the termination of an outgoing call as described in relation to the call flow 400 (FIG. 4), the first option 532 (FIG. 5), or the second option 538 (FIG. 5). In contrast, the UE may determine that the outgoing call is to be maintained based on the source of the incoming call being determined to be different from the remote device or the UE being the originator of the previous call.

The approaches described herein may be verified in lab or live network by simulating the temporary call drop with 2 users, and call collision with same users immediately. On an event of call collision, UE with approaches described herein may try to terminate outgoing call procedure and proceed with incoming call just received.

Figure 9:
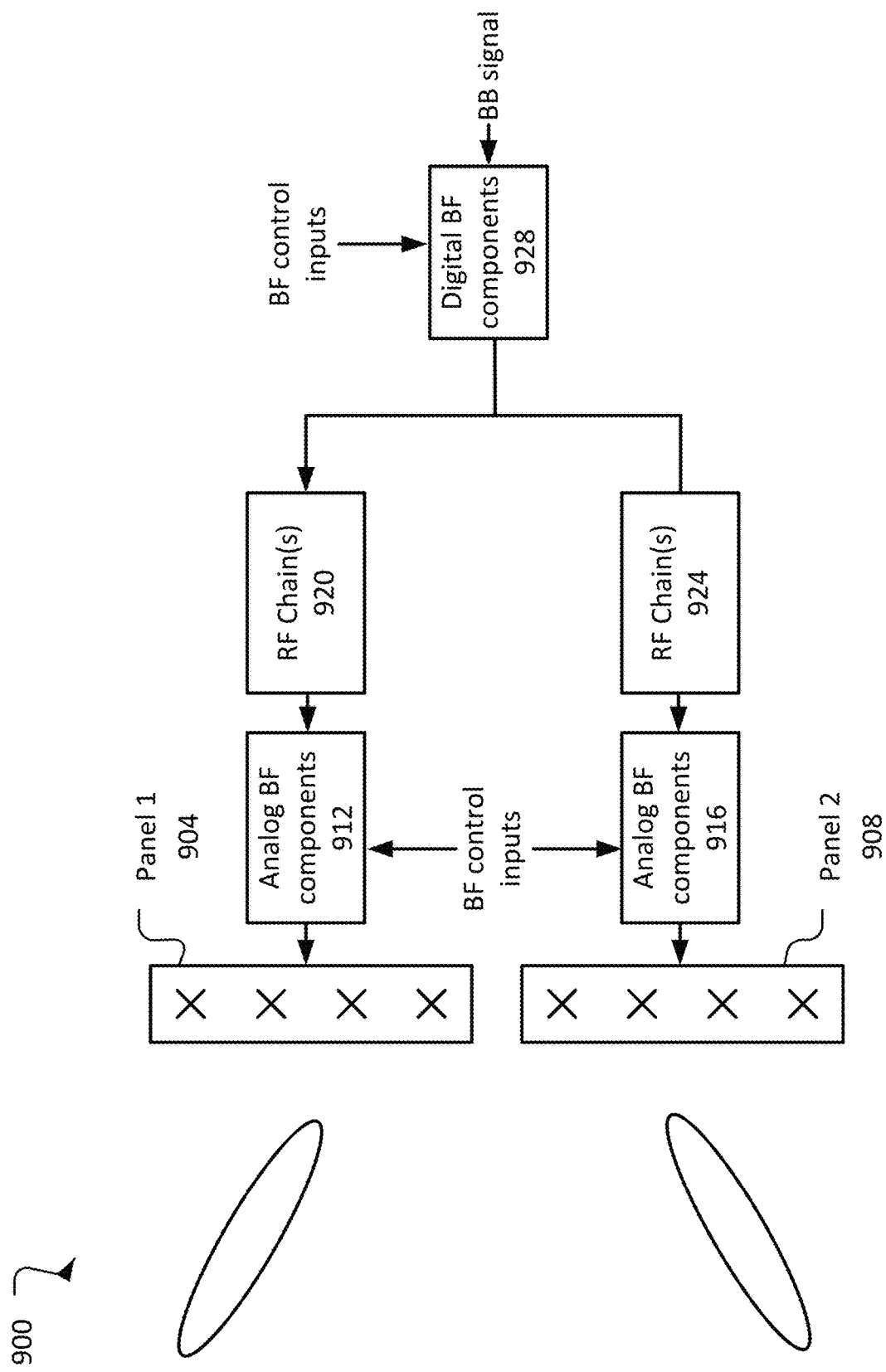
FIG. 9 illustrates example beamforming circuitry in accordance with some embodiments.

FIG. 9 illustrates example beamforming circuitry 900 in accordance with some embodiments. The beamforming circuitry 900 may include a first antenna panel, panel 1 904, and a second antenna panel, panel 2 908. Each antenna panel may include a number of antenna elements. Other embodiments may include other numbers of antenna panels.

Figure 10:
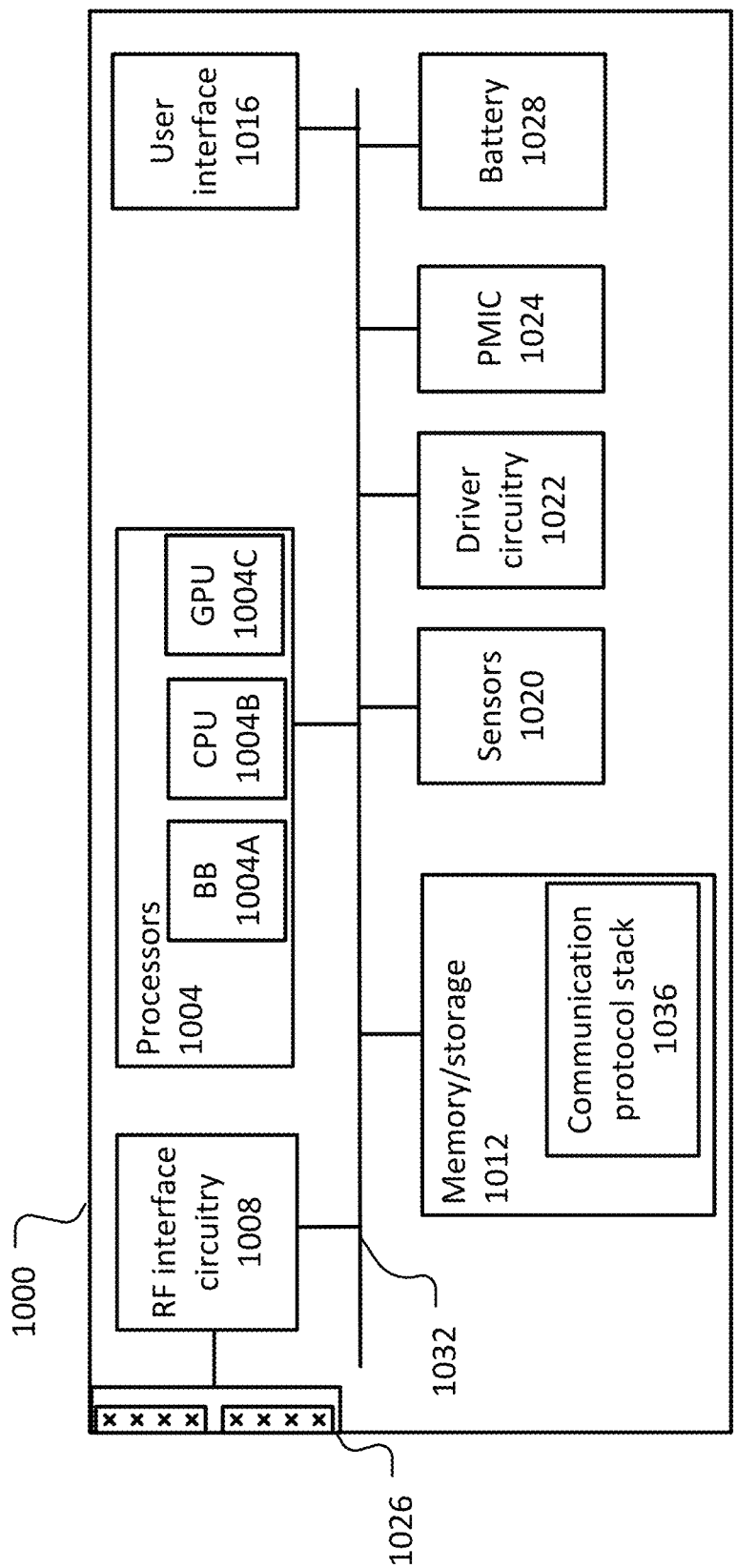
FIG. 10 illustrates an example UE in accordance with some embodiments.

Digital beamforming (BF) components 928 may receive an input baseband (BB) signal from, for example, a baseband processor such as, for example, baseband processor 1004A of FIG. 10. The digital BF components 928 may rely on complex weights to pre-code the BB signal and provide a beamformed BB signal to parallel radio frequency (RF) chains 920/924.

Each RF chain 920/924 may include a digital-to-analog converter to convert the BB signal into the analog domain; a mixer to mix the baseband signal to an RF signal; and a power amplifier to amplify the RF signal for transmission.

The RF signal may be provided to analog BF components 912/916, which may apply additionally beamforming by providing phase shifts in the analog domain. The RF signals may then be provided to antenna panels 904/908 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 10 illustrates an example UE 1000 in accordance with some embodiments. The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1000 may be a RedCap UE or NR-Light UE.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

In some embodiments, the UE 1000 may include the beamforming circuitry 900 (FIG. 9), where the beamforming circuitry 900 may be utilized for communication with the UE 1000. In some embodiments, components of the UE 1000 and the beamforming circuitry may be shared. For example, the antennas 1026 of the UE may include the panel 1 904 and the panel 2 908 of the beamforming circuitry 900.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1000 may power down for brief intervals of time and thus save power. If there is no data traffic activity for an extended period of time, then the UE 1000 may transition off to an RRC Idle state, where it disconnects from the network and does not perform operations such as channel quality feedback, handover, etc. The UE 1000 goes into a very low power state and it performs paging where again it periodically wakes up to listen to the network and then powers down again. The UE 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
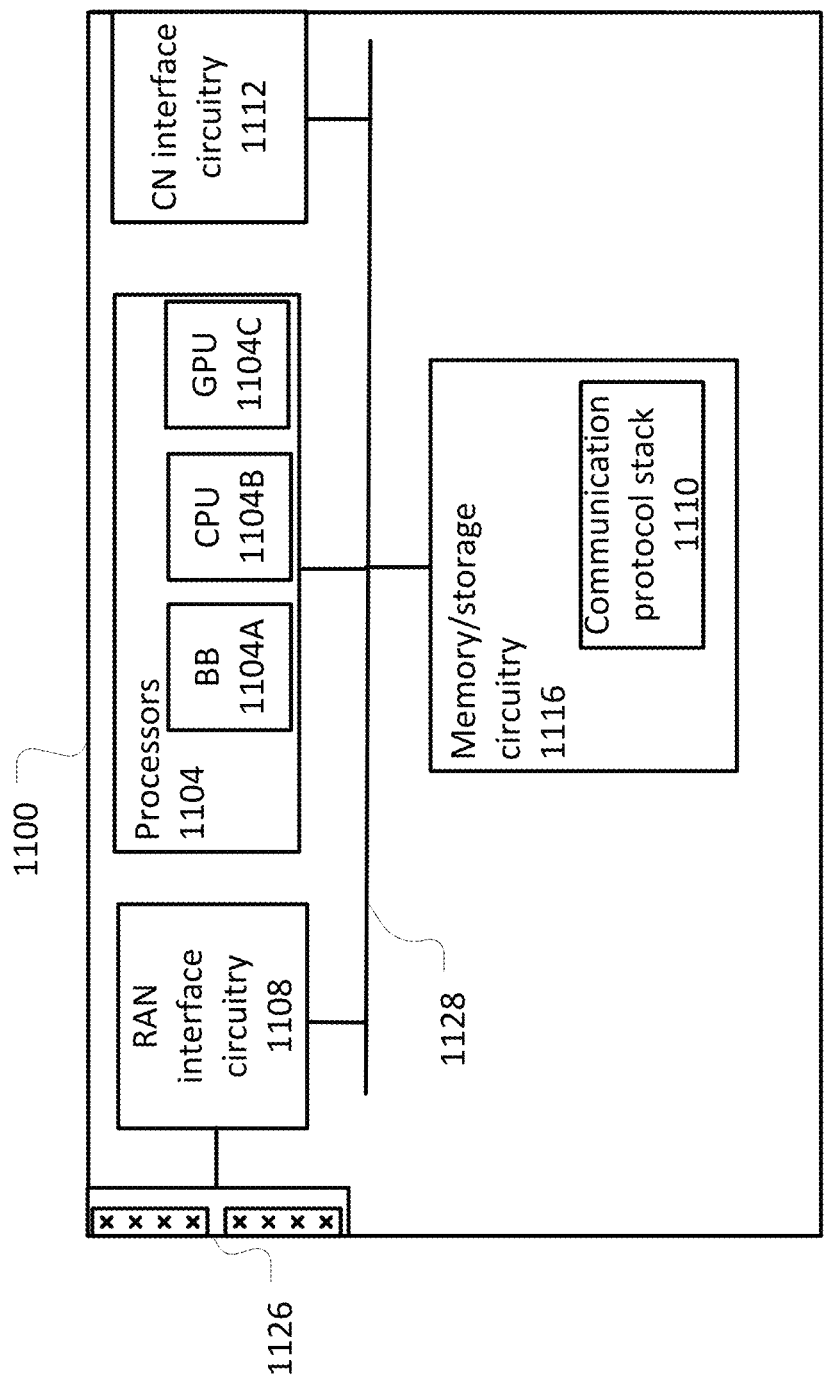
FIG. 11 illustrates an example gNB in accordance with some embodiments.

FIG. 11 illustrates an example gNB 1100 in accordance with some embodiments. The gNB 1100 may include processors 1104, RF interface circuitry 1108, CN interface circuitry 1112, memory/storage circuitry 1116, and antenna structure 1126.

The components of the gNB 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10.

The CN interface circuitry 1112 may provide connectivity to a CN, for example, a 5GC using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

As described above, one aspect of the present technology is the gathering and use of data available from specific and legitimate sources to resolve call conflicts. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to determining whether a call conflict between two devices exists. Further, the information data may be used for determining which of the devices is to terminate an outgoing call to resolve the call conflict.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, "opt in" or "opt out" options may be presented for application of the call conflict resolution.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include one or more computer-readable media having instructions that, when executed by one or more processors, cause a user equipment (UE) to initiate an outgoing call to a remote device, detect an indication of an incoming call during a connection process of the outgoing call, the indication to include an identifier of a source of the incoming call, determine, based on the identifier of the source, whether the source of the incoming call is the remote device, and determine, based on whether the source of the incoming call is the remote device, whether to terminate the outgoing call.

Example 2 may include the one or more computer-readable media of example 1, wherein to determine whether the source of the incoming call is the remote device includes to determine that the source of the incoming call is the remote device, wherein to determine whether to terminate the outgoing call includes to determine to terminate the outgoing call based on the source of the incoming call being the remote device, and wherein the instructions, when executed by the one or more processors, further cause the UE to terminate the outgoing call based on the determination to terminate the outgoing call.

Example 3 may include the one or more computer-readable media of example 1, wherein to determine whether the source of the incoming call is the remote device includes to determine that the source of the incoming call is the remote device, and wherein the instructions, when executed by the one or more processors, further cause the UE to identify a previous call between the UE and the remote device, and determine an originator of the previous call, wherein to determine whether to terminate the outgoing call is further based on the originator of the previous call.

Example 4 may include the one or more computer-readable media of example 3, wherein to determine whether to terminate the outgoing call includes to determine to terminate the outgoing call based on a determination that the originator of the previous call is the remote device.

Example 5 may include the one or more computer-readable media of example 3, wherein the instructions, when executed by the one or more processors, further cause the UE to determine whether the previous call was dropped, wherein to determine the originator of the previous call includes to determine the originator of the previous call based on a determination of whether the previous call was dropped.

Example 6 may include the one or more computer-readable media of example 1, wherein the connection process extends from the initiation of the outgoing call until the outgoing call causes the remote device to ring.

Example 7 may include the one or more computer-readable media of example 1, wherein the instructions, when executed by the one or more processors, further cause the UE to determine a previous call between the UE and the remote device was dropped, and store an identifier for the remote device based on the previous call being dropped, wherein to determine whether the source is the remote device includes to compare the identifier of the source with the identifier for the remote device.

Example 8 may include the one or more computer-readable media of example 1, wherein to determine whether the source of the incoming call is the remote device includes to determine that the source of the incoming call is the remote device, wherein to determine whether to terminate the outgoing call includes to determine to terminate the outgoing call based on the source of the incoming call being the remote device, and wherein the instructions, when executed by the one or more processors, further cause the UE to accept the incoming call.

Example 9 may include a user equipment (UE), comprising memory to store an identifier of a remote device that originated a call, and one or more processors coupled to the memory, the one or more processors to detect that the call between the remote device and the UE was dropped, store the identifier of the remote device based on the detection that the call was dropped, detect an indication of an incoming call during a connection process of an outgoing call, compare the identifier of the remote device with an identifier for a source of the incoming call, and determine whether to accept the incoming call based on the comparison of the identifier of the remote device with the identifier for the source.

Example 10 may include the UE of example 9, wherein to detect the indication of the incoming call includes to detect an invitation received from the source, wherein the invitation includes the identifier for the source.

Example 11 may include the UE of example 9, to determine whether to accept the incoming call includes to determine to accept the incoming call based on the identifier of the remote device matching the identifier for the source.

Example 12 may include the UE of example 9, wherein to detect the indication of the incoming call during the connection process includes to detect the indication of the incoming call between an initiation of the outgoing call and the outgoing call ringing at the remote device.

Example 13 may include the UE of example 9, wherein to determine whether to accept the outgoing call is further based on the remote device having originate the call.

Example 14 may include the UE of example 9, wherein the one or more processors are further to terminate the outgoing call based on the identifier of the remote device matching the identifier for the source.

Example 15 may include the UE of example 9, wherein the UE is a first UE, and wherein the source is a second UE.

Example 16 may include a method of completing a phone call with a user equipment (UE), comprising initiating, by the UE, a connection process for an outgoing call to a remote device, identifying, by the UE, an identifier of a source of an incoming call received by the UE during the connection process, determining, by the UE, whether the source of the incoming call is the remote device based on the identifier of the source, and determining, by the UE, whether to terminate the outgoing call based on whether the source of the incoming call is the remote device.

Example 17 may include the method of example 16, wherein determining whether the source of the incoming call is the remote device includes determining that the source of the incoming call is the remote device, and wherein determining whether to terminate the outgoing call includes determining to terminate the outgoing call based on the source of the incoming call being the remote device.

Example 18 may include the method of example 16, further comprising identifying, by the UE, a previous call between the UE and the remote device that was dropped, and determining, by the UE, an originator of the previous call, wherein determining whether to terminate the outgoing call is further based on the originator of the previous call.

Example 19 may include the method of example 16, wherein the connection process includes initiating the outgoing call until causing the remote device to ring for the outgoing call.

Example 20 may include the method of example 16, wherein determining whether the source of the incoming call is the remote device includes comparing the identifier of the source with an identifier of the remote device to determine whether the identifier of the source matches the identifier of the remote device.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   detect that a prior call between a user equipment (UE) and a remote device was dropped;
   initiate an outgoing call to the remote device;
   detect an indication of an incoming call during a connection process of the outgoing call, the indication to include an identifier of a source of the incoming call;
   determine, based on the identifier of the source, that the source of the incoming call is the remote device;
   determine an originator of the prior call based on determining that the source of the incoming call is the remote device;
   determine, based on the originator of the prior call being the remote device, to terminate the outgoing call; and
   accept the incoming call.

2. The one or more non-transitory computer-readable media of claim 1, wherein the instructions, when executed, further cause the processing circuitry to terminate the outgoing call based on the determination to terminate the outgoing call.

3. The one or more non-transitory computer-readable media of claim 1, wherein the connection process extends from the initiation of the outgoing call until the outgoing call causes the remote device to ring.

4. The one or more non-transitory computer-readable media of claim 1, wherein the identifier of the source includes a FROM header, and wherein the source of the incoming call is determined based on the FROM header.

5. The one or more non-transitory computer-readable media of claim 1, wherein the identifier of the source includes a P-Asserted-Identity, and wherein the source of the incoming call is determined based on the P-Asserted-Identity.

6. The one or more non-transitory computer-readable media of claim 1, wherein the instructions, when executed, further cause the processing circuitry to:

generate, for transmission, a notification that the outgoing call has been terminated based on the determination to terminate the outgoing call.

7. The one or more non-transitory computer-readable media of claim 1, wherein the instructions, when executed, further cause the processing circuitry to:
store an identifier of the remote device based on detecting that the prior call was dropped, wherein the originator of the prior call is determined based on the stored identifier of the remote device.

8. A method, comprising:
detecting that a prior call between a user equipment (UE) and a remote device was dropped;
initiating a connection process for an outgoing call to the remote device;
identifying an identifier of a source of an incoming call received during the connection process;
determining that the source of the incoming call is the remote device based on the identifier of the source;
determining an originator of the prior call based on determining that the source of the incoming call is the remote device;
determining to terminate the outgoing call based on the originator of the prior call being the remote device; and
accepting the incoming call.

9. The method of claim 8, wherein the connection process includes initiating the outgoing call until causing the remote device to ring for the outgoing call.

10. The method of claim 8, wherein determining that the source of the incoming call is the remote device includes comparing the identifier of the source with an identifier of the remote device to determine that the identifier of the source matches the identifier of the remote device.

11. An apparatus comprising:
processing circuitry to:
detect that a prior call between a user equipment (UE) and a remote device was dropped;
initiate an outgoing call to the remote device;
detect an indication of an incoming call during a connection process of the outgoing call, the indication to include an identifier of a source of the incoming call;
determine, based on the identifier of the source, that the source of the incoming call is the remote device;
determine an originator of the prior call based on determining that the source of the incoming call is the remote device;
determine, based on the originator of the prior call being the remote device, to terminate the outgoing call; and
accept the incoming call; and
interface circuitry coupled with the processing circuitry, the interface circuitry to enable communication.

12. The apparatus of claim 11, wherein the processing circuitry is further to terminate the outgoing call based on the determination to terminate the outgoing call.

13. The apparatus of claim 11, wherein the identifier of the source includes a FROM header, and wherein the source of the incoming call is determined based on the FROM header.

14. The apparatus of claim 11, wherein the identifier of the source includes a P-Asserted-Identity, and wherein the source of the incoming call is determined based on the P-Asserted-Identity.

* * * * *